(12) United States Patent
Saeki

(10) Patent No.: US 11,060,448 B2
(45) Date of Patent: Jul. 13, 2021

(54) TURBOCHARGER

(71) Applicant: TOYOTA JIDOSHA KABUSHIKI KAISHA, Toyota (JP)

(72) Inventor: Masanori Saeki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/686,618

(22) Filed: Nov. 18, 2019

(65) Prior Publication Data
US 2020/0173351 A1   Jun. 4, 2020

(30) Foreign Application Priority Data

Nov. 29, 2018 (JP) ............... JP2018-223248

(51) Int. Cl.
| | |
|---|---|
| F02B 37/18 | (2006.01) |
| F01D 17/10 | (2006.01) |
| F02B 37/02 | (2006.01) |
| F02B 39/00 | (2006.01) |
| F02C 6/12 | (2006.01) |

(52) U.S. Cl.
CPC .......... F02B 37/186 (2013.01); F01D 17/105 (2013.01); *F02B 37/025* (2013.01); *F02B 39/00* (2013.01); *F02C 6/12* (2013.01); *F05D 2220/40* (2013.01); *F05D 2260/606* (2013.01); *F05D 2260/96* (2013.01)

(58) Field of Classification Search
CPC ...... F01D 17/105; F02C 6/12; F05D 2220/40; F05D 2230/21; F05D 2260/606; F05D 2260/96; Y02T 10/12
See application file for complete search history.

(56) References Cited

U.S. PATENT DOCUMENTS

| | | | | |
|---|---|---|---|---|
| 9,869,238 | B2* | 1/2018 | Stilgenbauer | ......... F02B 37/183 |
| 10,227,915 | B2* | 3/2019 | Murphy | ................ F02B 37/186 |
| 10,526,958 | B2* | 1/2020 | Cooley | ................. F01D 17/145 |
| 10,598,082 | B2* | 3/2020 | Marsal | .................... F16K 1/205 |

(Continued)

FOREIGN PATENT DOCUMENTS

| | | |
|---|---|---|
| DE | 102011017523 A1 | 10/2012 |
| DE | 102011083369 A1 | 3/2013 |

(Continued)

OTHER PUBLICATIONS

U.S. Appl. No. 16/692,113, filed Nov. 22, 2019 in the name of Takashi Tsukiyama et al.

(Continued)

*Primary Examiner* — Jesse S Bogue
(74) *Attorney, Agent, or Firm* — Oliff PLC

(57) ABSTRACT

A turbocharger includes a turbine housing accommodating a turbine wheel, and a waste gate valve connected to the turbine housing. A valve seat for the waste gate valve is provided at an opening edge of a bypass passage on an inner wall surface of the turbine housing. The waste gate valve includes a shaft rotatably supported by a wall, and a valve element extending in a radial direction of the shaft from an end portion of the shaft on an inner side of the turbine housing. A contact surface of the valve seat and a contact surface of the valve element are a flat surface. The waste gate valve is a one-piece molding including the shaft and the valve element.

3 Claims, 13 Drawing Sheets

(56) References Cited

U.S. PATENT DOCUMENTS

| | | | |
|---|---|---|---|
| 10,626,789 B2* | 4/2020 | Day | F16K 1/443 |
| 2010/0187460 A1 | 7/2010 | An et al. | |
| 2015/0292395 A1* | 10/2015 | Dilalan | F02B 37/186 |
| | | | 60/602 |
| 2016/0201693 A1 | 7/2016 | An et al. | |
| 2018/0045105 A1* | 2/2018 | Tomanec | F01D 17/105 |
| 2018/0156105 A1 | 6/2018 | Igarashi | |
| 2020/0063649 A1* | 2/2020 | Marsal | F16K 1/2028 |

FOREIGN PATENT DOCUMENTS

| | | |
|---|---|---|
| JP | 2004-512453 A | 4/2004 |
| JP | 2009-068380 A | 4/2009 |
| JP | 2009-092026 A | 4/2009 |
| JP | 2013-015095 A | 1/2013 |
| JP | 2013-079591 A | 5/2013 |
| JP | 2014-047680 A | 3/2014 |
| JP | 2015-127517 A | 7/2015 |
| JP | 2016-118105 A | 6/2016 |
| JP | 2017-078435 A | 4/2017 |
| JP | 2017-082762 A | 5/2017 |
| JP | 2018-040317 A | 3/2018 |
| JP | 2018-053837 A | 4/2018 |
| JP | 2018-071410 A | 5/2018 |
| JP | 2018-087555 A | 6/2018 |
| JP | 2018-087556 A | 6/2018 |
| JP | 2018-091275 A | 6/2018 |
| JP | 6639728 B1 | 2/2020 |
| WO | 2002/023047 A1 | 3/2002 |
| WO | 2015/001644 A1 | 1/2015 |

OTHER PUBLICATIONS

U.S. Appl. No. 16/692,493, filed Nov. 22, 2019 in the name of Naoki Igarashi et al.

* cited by examiner

TURBOCHARGER

INCORPORATION BY REFERENCE

The disclosure of Japanese Patent Application No. 2018-223248 filed on Nov. 29, 2018 including the specification, drawings and abstract is incorporated herein by reference in its entirety.

BACKGROUND

1. Technical Field

The disclosure relates to a turbocharger.

2. Description of Related Art

A turbine wheel is accommodated in a turbine housing of a turbocharger described in Japanese Unexamined Patent Application Publication No. 2009-092026 (JP 2009-092026 A). A bypass passage is partitioned in the turbine housing. The bypass passage bypasses the turbine wheel to connect an exhaust gas upstream-side portion upstream of the turbine wheel and an exhaust gas downstream-side portion downstream of the turbine wheel. A waste gate valve is connected to the turbine housing. The waste gate valve opens or closes the bypass passage. A shaft of the waste gate valve is rotatably supported by a wall of the turbine housing. A support arm extends outward in a radial direction of the shaft from an end portion of the shaft. A valve element is rockably connected to the support arm.

SUMMARY

In the turbocharger of JP 2009-092026 A, since the valve element is allowed to rock relative to the support arm, chatter occurs at the portion where the valve element is connected to the support arm, for example, when the waste gate valve sets the bypass passage from an open state to a fully closed state or when the pressure of exhaust gas from the bypass passage fluctuates while the waste gate valve places the bypass passage in the open state. An occupant of a vehicle may hear such chatter as noise, so such chatter is not desirable.

An aspect of the disclosure relates to a turbocharger. The turbocharger includes a turbine housing accommodating a turbine wheel, and a waste gate valve connected to the turbine housing. The turbine housing defines a bypass passage. The bypass passage bypasses the turbine wheel and connects a portion upstream of the turbine wheel in a direction of flow of exhaust gas and a portion downstream of the turbine wheel in a direction of flow of exhaust gas. The waste gate valve is configured to open the bypass passage and to close the bypass passage. A valve seat for the waste gate valve is provided at an opening edge of the bypass passage on an inner wall surface of the turbine housing. The waste gate valve includes a shaft and a valve element. The shaft extends through a wall of the turbine housing. The shaft is rotatably supported by the wall. The valve element extends in a radial direction of the shaft from an end portion of the shaft on an inner side of the turbine housing. A contact surface of the valve seat and a contact surface of the valve element are a flat surface. The contact surface of the valve seat is brought into contact with the valve element, and the contact surface of the valve element, which is brought into contact with the valve seat. The waste gate valve is a one-piece molding including the shaft and the valve element. With the above configuration, since the shaft and the valve element are molded as one piece, the valve element does not rock relative to the shaft. Thus, chatter resulting from rocking of the valve element is reduced.

In the turbocharger, a rotation axis of the shaft may be located away from the valve seat toward a portion downstream of the bypass passage in the direction of flow of exhaust gas in a direction perpendicular to the contact surface of the valve seat. In a cross section perpendicular to the rotation axis of the shaft and intersecting with the contact surface of the valve seat, a first distance may be shorter than a second distance. The first distance may be a distance from the contact surface of the valve element to the rotation axis of the shaft in a direction perpendicular to the contact surface of the valve element. The second distance may be a distance from the contact surface of the valve seat to the rotation axis of the shaft in a direction perpendicular to the contact surface of the valve seat.

In a turbocharger, even when the valve seat of the turbine housing and the valve element of the waste gate valve are designed to be in surface contact with each other in the fully closed state of the bypass passage, the valve seat and the valve element do not make surface contact with each other when there is a manufacturing error, or the like. Particularly, when the distance from the contact surface of the valve element to the rotation axis of the shaft in the direction perpendicular to the contact surface of the valve element is longer than the designed distance, the valve element interferes with the valve seat before the waste gate valve fully closes, and the waste gate valve cannot rotate any more toward the closing side. With the above configuration, since the distance from the contact surface of the valve element to the rotation axis of the shaft in the direction perpendicular to the contact surface of the valve element is shorter than the distance from the contact surface of the valve seat to the rotation axis of the shaft in the direction perpendicular to the contact surface of the valve seat. Therefore, even when there occurs some manufacturing error in the turbine housing or the waste gate valve, the valve element is difficult to interfere with the valve seat before the waste gate valve fully closes. Thus, in comparison with the configuration in which the distance from the contact surface of the valve element to the rotation axis of the shaft in the direction perpendicular to the contact surface of the valve element is longer than the distance from the contact surface of the valve seat to the rotation axis of the shaft in the direction perpendicular to the contact surface of the valve seat, an angle that the contact surface of the valve seat makes with the contact surface of the valve element in the fully closed state of the bypass passage can be reduced. As a result, in the fully closed state of the bypass passage, a gap that is formed between the contact surface of the valve seat and the contact surface of the valve element can be reduced.

The turbocharger may further include a link mechanism coupled to an end portion of the shaft on an outer side of the turbine housing and configured to transmit driving force from an actuator to the shaft. The link mechanism may include a link arm coupled to the end portion of the shaft on the outer side of the turbine housing, and a link rod coupled to a portion of the link arm, spaced apart from a center of coupling between the link arm and the shaft in the radial direction of the shaft. The link rod may be configured to move from one side toward the other side in a longitudinal direction of the link rod when the bypass passage is set from an open state to a fully closed state. In the fully closed state of the bypass passage, an imaginary straight line along the longitudinal direction of the link rod may intersect with an imaginary plane parallel to the contact surface of the valve seat. In the fully closed state of the bypass passage, the contact surface of the valve element may be inclined such that a portion of the contact surface shifts toward the other side in the longitudinal direction of the link rod relative to the rotation axis of the shaft as the portion of the contact surface comes away from the link arm in a direction of the rotation axis of the shaft.

With the above configuration, when the bypass passage is maintained in the fully closed state, force acts on the shaft of the waste gate valve from the link arm of the link mechanism in the direction from the one side toward the other side in the longitudinal direction of the link rod. As a result, the shaft of the waste gate valve inclines such that the end portion on the outer side of the turbine housing is located on the other side in the longitudinal direction and the end portion on the inner side of the turbine housing is located on the one side in the longitudinal direction. With the above configuration, since the waste gate valve is a one-piece molding including the shaft and the valve element, when the shaft inclines, the valve element fixed to the shaft also inclines. With the above configuration, since the contact surface of the valve element is inclined in anticipation of such an inclination of the valve element, a gap that is formed between the valve element and the valve seat resulting from the inclination of the shaft of the waste gate valve can be reduced.

In the turbocharger, the valve element may include a valve main body having the contact surface of the valve element and a connecting portion connecting the valve main body and the shaft. The connecting portion may have a greater size in a direction perpendicular to the contact surface of the valve element toward the shaft.

With the above configuration, stress that is generated when the valve element is pressing the valve seat increases as a portion of the valve element approaches the shaft. With the above configuration, since the thickness of the valve element is increased as the stress of the valve element increases, a deformation, crack, or the like, in the valve element is reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments will be described with reference to FIG. 1 to FIG. 15B. First, the configuration of passages for intake air and exhaust gas in an internal combustion engine 10 for a vehicle will be described.

Figure 1:
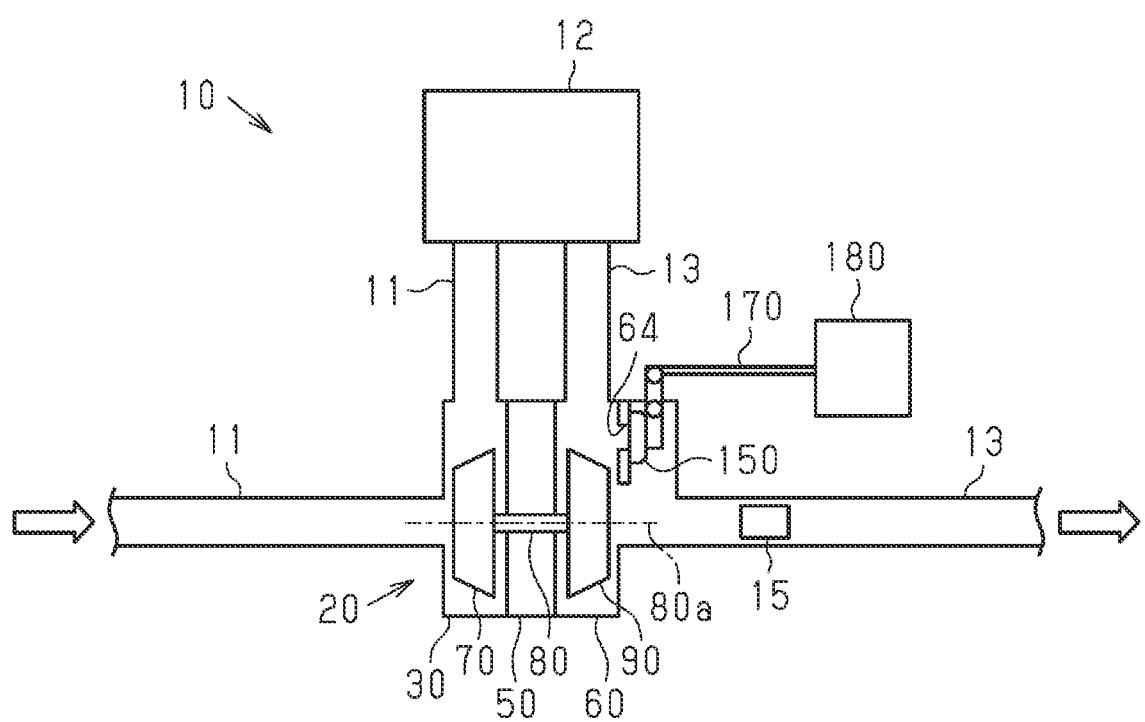
FIG. 1 is a schematic diagram of an internal combustion engine.

As shown in FIG. 1, the internal combustion engine 10 includes an intake pipe 11. Intake air from the outside of the internal combustion engine 10 flows through the intake pipe 11. An engine body 12 in which a cylinder is defined is connected to the downstream end of the intake pipe 11. In the cylinder of the engine body 12, fuel is mixed with intake air, and the air-fuel mixture is burnt. The upstream end of an exhaust pipe 13 is connected to the engine body 12. Exhaust gas emitted from the engine body 12 flows through the exhaust pipe 13. A catalyst 15 for controlling exhaust gas is installed in the exhaust pipe 13.

The internal combustion engine 10 includes a turbocharger 20 for compressing intake air by using flow of exhaust gas. A compressor housing 30 of the turbocharger 20 is connected in the intake pipe 11. A turbine housing 60 of the turbocharger 20 is connected at a portion upstream of the catalyst 15 in the exhaust pipe 13.

The compressor housing 30 and the turbine housing 60 are connected via a bearing housing 50 in the turbocharger 20.

A compressor wheel 70 is accommodated in the compressor housing 30. The compressor wheel 70 compresses intake air. One end portion of a coupling shaft 80 is connected to the compressor wheel 70. A center part of the coupling shaft 80 is accommodated in the bearing housing 50. The coupling shaft 80 is supported so as to be rotatable relative to the bearing housing 50. A turbine wheel 90 is connected to the other end portion of the coupling shaft 80. The turbine wheel 90 is rotated by the flow of exhaust gas. The turbine wheel 90 is accommodated in the turbine housing 60. As the turbine wheel 90 is rotated by the flow of exhaust gas, the compressor wheel 70 coupled to the turbine wheel 90 via the coupling shaft 80 rotates together. When the compressor wheel 70 rotates, intake air is compressed.

Next, the overall configuration of the turbocharger 20 will be described. In the following description, it is assumed that the internal combustion engine 10 is mounted on a vehicle and an up-down direction of the vehicle is an up-down direction of the turbocharger 20. A direction along a rotation axis 80a of the coupling shaft 80 is simply referred to as rotation axis direction. A compressor wheel 70 side in the rotation axis direction is defined as one side, and a turbine wheel 90 side in the rotation axis direction is defined as the other side.

Figure 2:
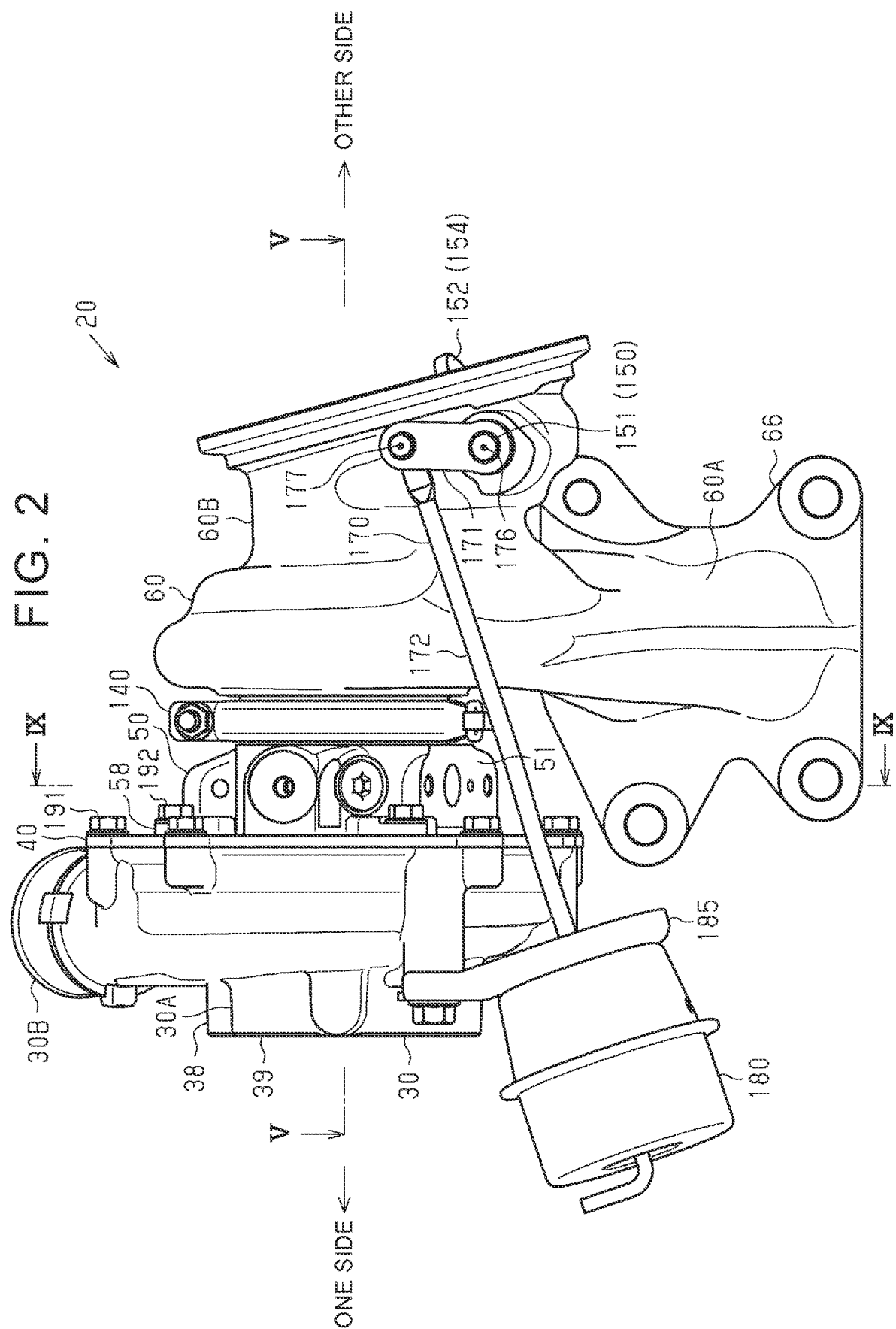
FIG. 2 is a front view of a turbocharger.
Figure 3:
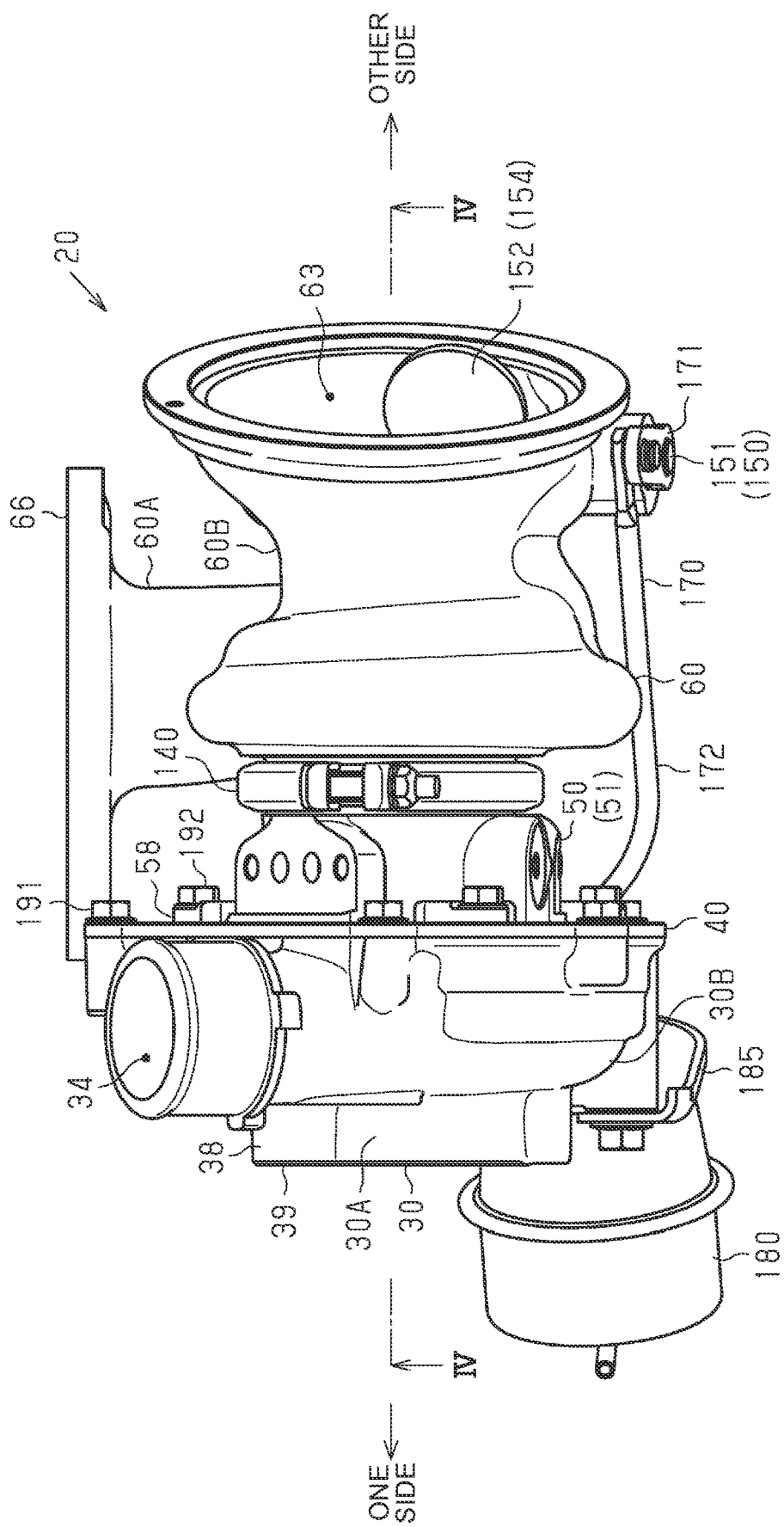
FIG. 3 is a plan view of the turbocharger.

As shown in FIG. 2 and FIG. 3, a housing body 39 of the compressor housing 30 includes a cylindrical portion 30A and a circular arc portion 30B. The cylindrical portion 30A has a substantially cylindrical shape and extends in the rotation axis direction. The circular arc portion 30B has a substantially circular arc shape and extends so as to surround the cylindrical portion 30A. The circular arc portion 30B surrounds an end portion of the cylindrical portion 30A on the other side (right side in FIG. 2) in the rotation axis direction.

Figure 4:
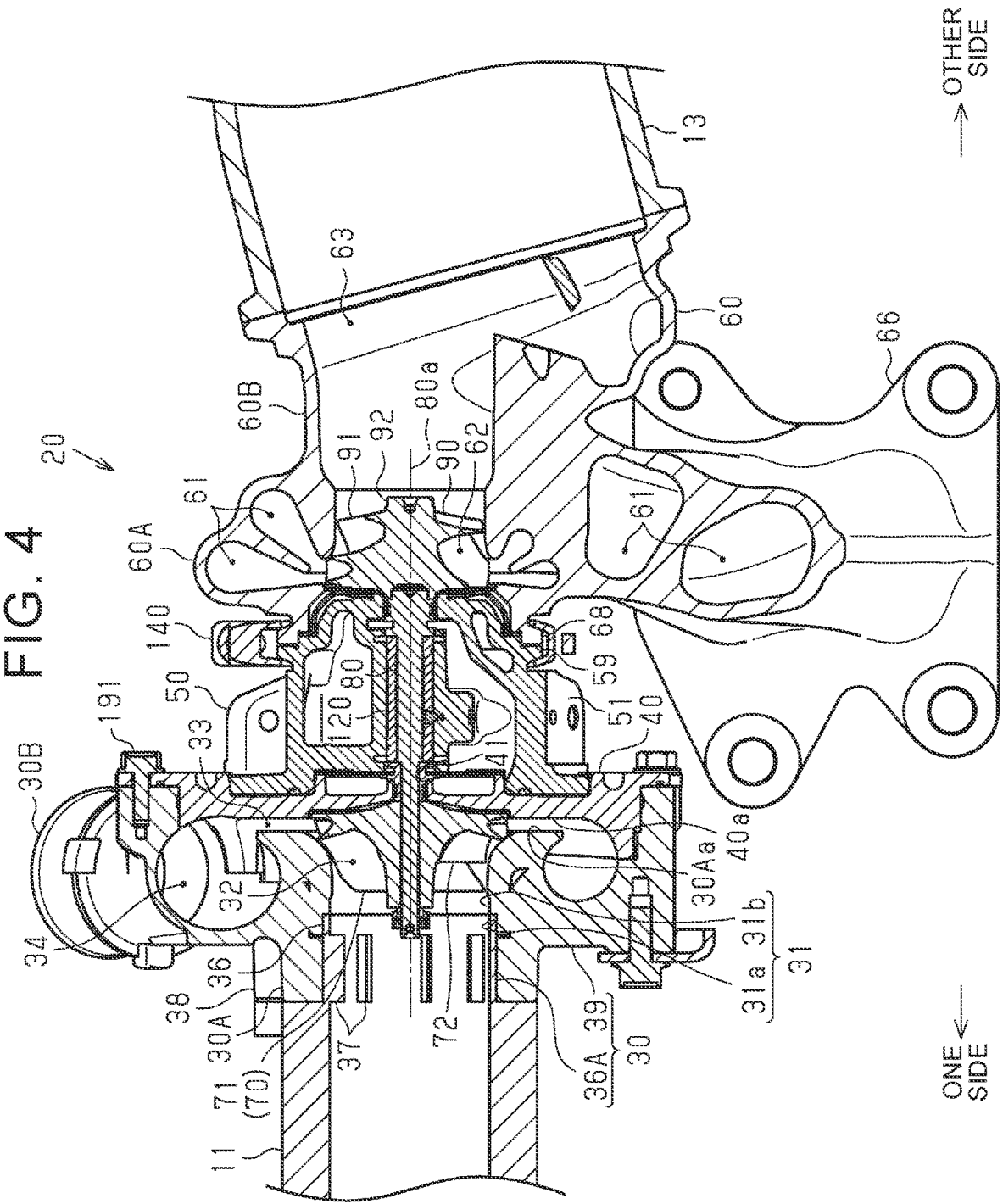
FIG. 4 is a cross-sectional view taken along the line IV-IV in FIG. 3.

As shown in FIG. 4, part of the inner space of the cylindrical portion 30A of the housing body 39 on the other side in the rotation axis direction is an accommodation space 32 for accommodating the compressor wheel 70. A central axis of the accommodation space 32 is coaxial with the rotation axis 80a of the coupling shaft 80.

An insertion hole 31 extends from one-side end of the accommodation space 32 in the rotation axis direction toward the one side in the rotation axis direction. The insertion hole 31 is open to the outer surface of the housing body 39. The central axis of the insertion hole 31 is coaxial with the rotation axis 80a of the coupling shaft 80.

A boss 38 protrudes from the outer periphery of the cylindrical portion 30A of the housing body 39. The boss 38 has a substantially cylindrical shape and extends in the rotation axis direction. The intake pipe 11 is fixed to the boss 38 by bolts (not shown). The intake pipe 11 is located upstream of the compressor housing 30.

A generally disc-shaped seal plate 40 is disposed on the other side of the housing body 39 in the rotation axis direction. The outside diameter of the seal plate 40 is substantially equal to the outside diameter of the circular arc portion 30B of the housing body 39. A radially outer portion of the seal plate 40 is fixed by bolts 191 to an end portion of the circular arc portion 30B of the housing body 39 on the other side in the rotation axis direction. An insertion hole 41 extends in the rotation axis direction through a radially center portion of the seal plate 40. The coupling shaft 80 is inserted through the insertion hole 41.

A scroll passage 34 is defined inside the circular arc portion 30B of the housing body 39. The scroll passage 34 discharges intake air from the housing body 39.

The scroll passage 34 extends in a circumferential direction around the rotation axis 80a of the coupling shaft 80 so as to surround the compressor wheel 70. The intake pipe 11 located downstream of the compressor housing 30 is fixed to an extended end portion of the circular arc portion 30B of the housing body 39. An end of the scroll passage 34 at the other side in the rotation axis direction reaches an end of the circular arc portion 30B at the other side in the rotation axis direction. A portion of the scroll passage 34 at the other side in the rotation axis direction is closed by an end surface 40a of the seal plate 40 on one side in the rotation axis direction. In other words, the end surface 40a of the seal plate 40 is part of an inner wall surface of the scroll passage 34. A portion of the accommodation space 32 at the other side in the rotation axis direction is closed by the end surface 40a of the seal plate 40.

A clearance is ensured between the end surface 40a of the seal plate 40 on one side in the rotation axis direction and an end surface 30Aa of the cylindrical portion 30A of the housing body 39 on the other side in the rotation axis direction. This clearance functions as a connection passage 33 that connects the accommodation space 32 of the cylindrical portion 30A and the scroll passage 34 of the circular arc portion 30B.

Figure 7:
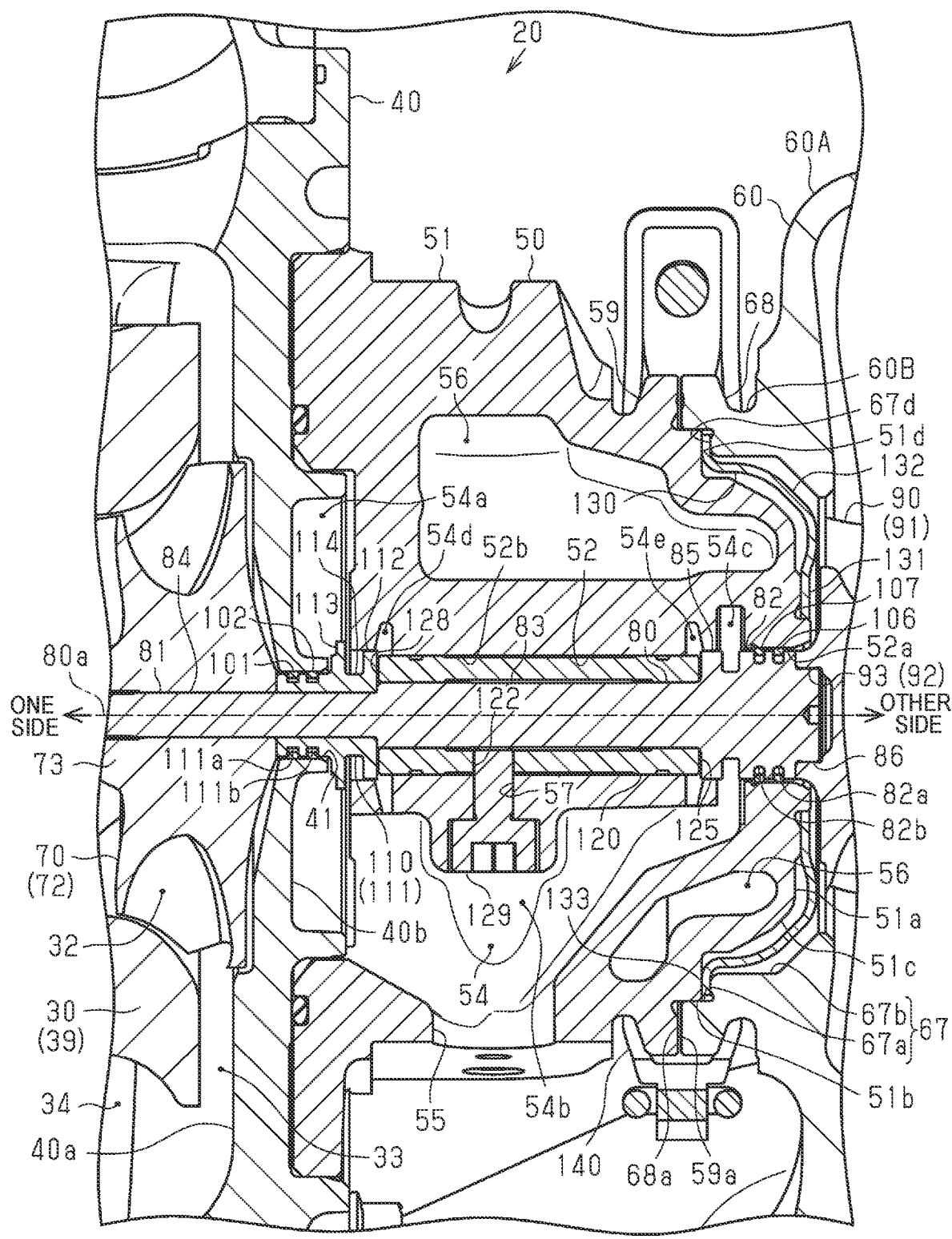
FIG. 7 is a partial cross-sectional view taken along the line VI-VI in FIG. 9.

As shown in FIG. 7, a body portion 51 of the bearing housing 50 is disposed on the other side of the seal plate 40 in the rotation axis direction. The body portion 51 has a generally circular columnar shape, and extends from the seal plate 40 toward the other side in the rotation axis direction.

A support hole 52 extends in the rotation axis direction through a radially center portion of the body portion 51. A central axis of the support hole 52 is coaxial with the rotation axis 80a of the coupling shaft 80.

Figure 9:
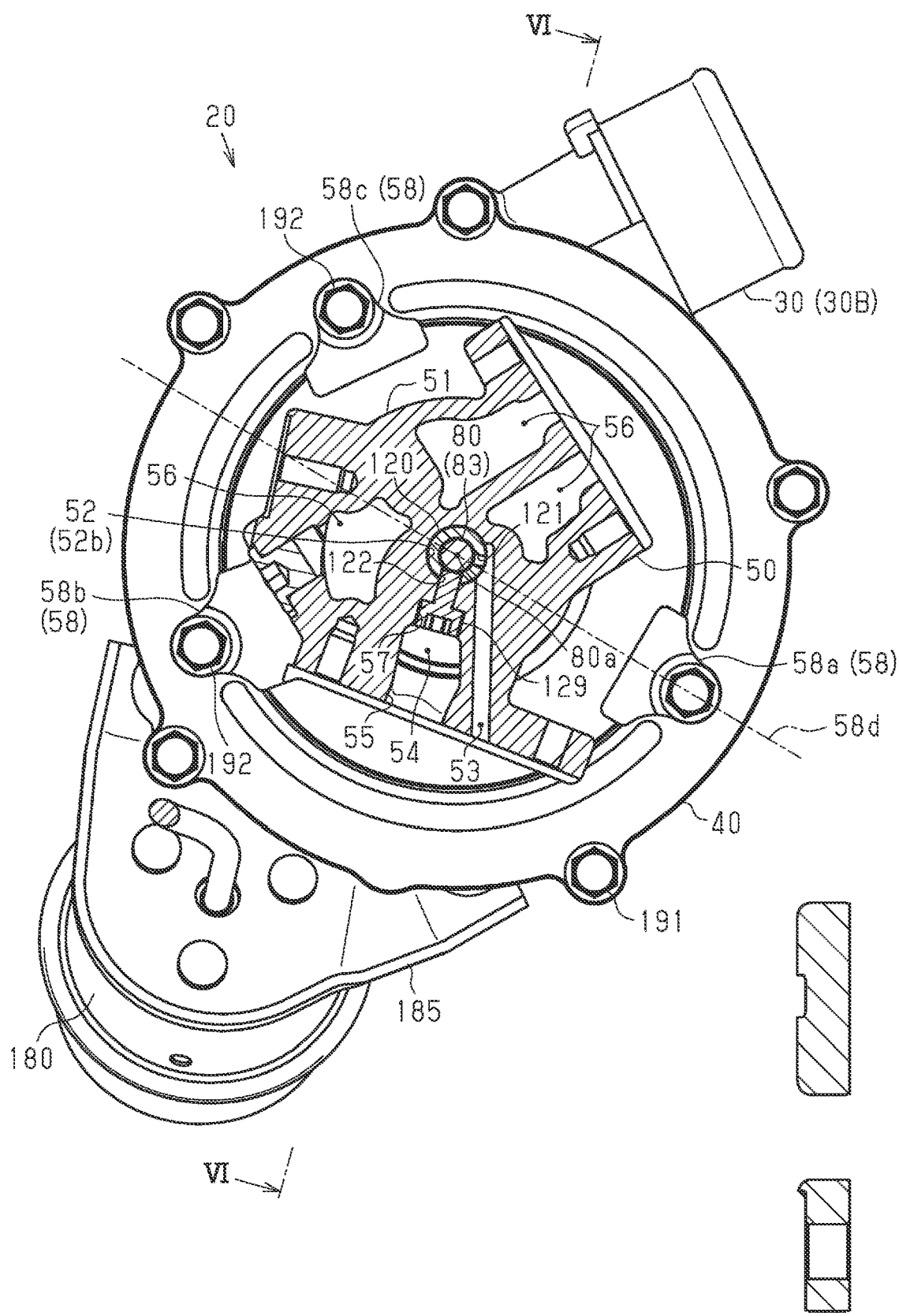
FIG. 9 is a cross-sectional view taken along the line IX-IX in FIG. 2.

As shown in FIG. 9, an oil introduction passage 53 is defined in the body portion 51. The oil introduction passage 53 is used to supply oil from the outside of the bearing housing 50 to the inside of the body portion 51. One end of the oil introduction passage 53 is connected to the support hole 52. The other end of the oil introduction passage 53 is open to the outer periphery of the body portion 51. The other end of the oil introduction passage 53 is located in the lower side of the outer periphery of the body portion 51. An oil supply pipe (not shown) is connected to the oil introduction passage 53. Oil is supplied to the oil introduction passage 53 via the oil supply pipe.

An oil drain space 54 is defined in the body portion 51. The oil drain space 54 is used to drain oil from the inside of the body portion 51 to the outside. A major part of the oil drain space 54 is located below the support hole 52. As shown in FIG. 7, the oil drain space 54 extends in the rotation axis direction. An end of the oil drain space 54 at one side in the rotation axis direction reaches an end of the body portion 51 at one side in the rotation axis direction. A portion of the oil drain space 54 at one side in the rotation axis direction is closed by an end surface 40b of the seal plate 40 on the other side in the rotation axis direction. In other words, the end surface 40b of the seal plate 40 is part of an inner wall surface of the oil drain space 54. The oil drain space 54 lies such that a portion of the oil drain space 54 shifts toward the lower side as the portion of the oil drain space 54 approaches from both ends of the body portion 51 toward the center in the rotation axis direction.

As shown in FIG. 7, an oil drain port 55 is defined in the body portion 51. The oil drain port 55 communicates the oil drain space 54 with the outside of the body portion 51. One end of the oil drain port 55 is connected to the lowest portion of the oil drain space 54. The other end of the oil drain port 55 is open to the outer periphery of the body portion 51. The other end of the oil drain port 55 is located in the lower side of the outer periphery of the body portion 51, and is adjacent to the other end (opening) of the oil introduction passage 53. An oil drain pipe (not shown) is connected to the oil drain port 55. Oil is drained from the oil drain port 55 via the oil drain pipe.

A coolant passage 56 is defined in the body portion 51. Coolant flows through the coolant passage 56. The coolant passage 56 extends in the rotation axis direction. Coolant fed under pressure from a water pump (not shown) flows through the coolant passage 56. The bearing housing 50 is cooled by heat exchange with coolant flowing through the coolant passage 56.

As shown in FIG. 7, a substantially cylindrical float bearing 120 is inserted in the support hole 52. The size of the float bearing 120 in the rotation axis direction is less than the size of the body portion 51 in the rotation axis direction. The float bearing 120 is disposed at the center portion of the body portion 51 in the rotation axis direction. As shown in FIG. 9, a supply hole 121 extends through the float bearing 120 in the radial direction of the float bearing 120. The supply hole 121 communicates with the oil introduction passage 53.

Oil is supplied to between the outer periphery of the float bearing 120 and the inner periphery of the support hole 52 via the oil introduction passage 53 of the bearing housing 50. Therefore, the float bearing 120 is supported by the body portion 51 of the bearing housing 50 in a state of being floated in oil supplied to between the outer periphery of the float bearing 120 and the inner periphery of the support hole 52.

The coupling shaft 80 is inserted in the float bearing 120. Oil is supplied to between the outer periphery of the coupling shaft 80 and the inner periphery of the float bearing 120 via the supply hole 121. Therefore, the coupling shaft 80 is rotatably supported via oil supplied to between the outer periphery of the coupling shaft 80 and the inner periphery of the float bearing 120.

As shown in FIG. 7, a clamp flange portion 59 projects outward in the radial direction of the coupling shaft 80 from a portion of the outer periphery of the body portion 51 of the bearing housing 50 on the other side relative to the center portion in the rotation axis direction. The clamp flange portion 59 extends all around in the circumferential direction of the coupling shaft 80 and is formed in a substantially annular shape.

Figure 8:
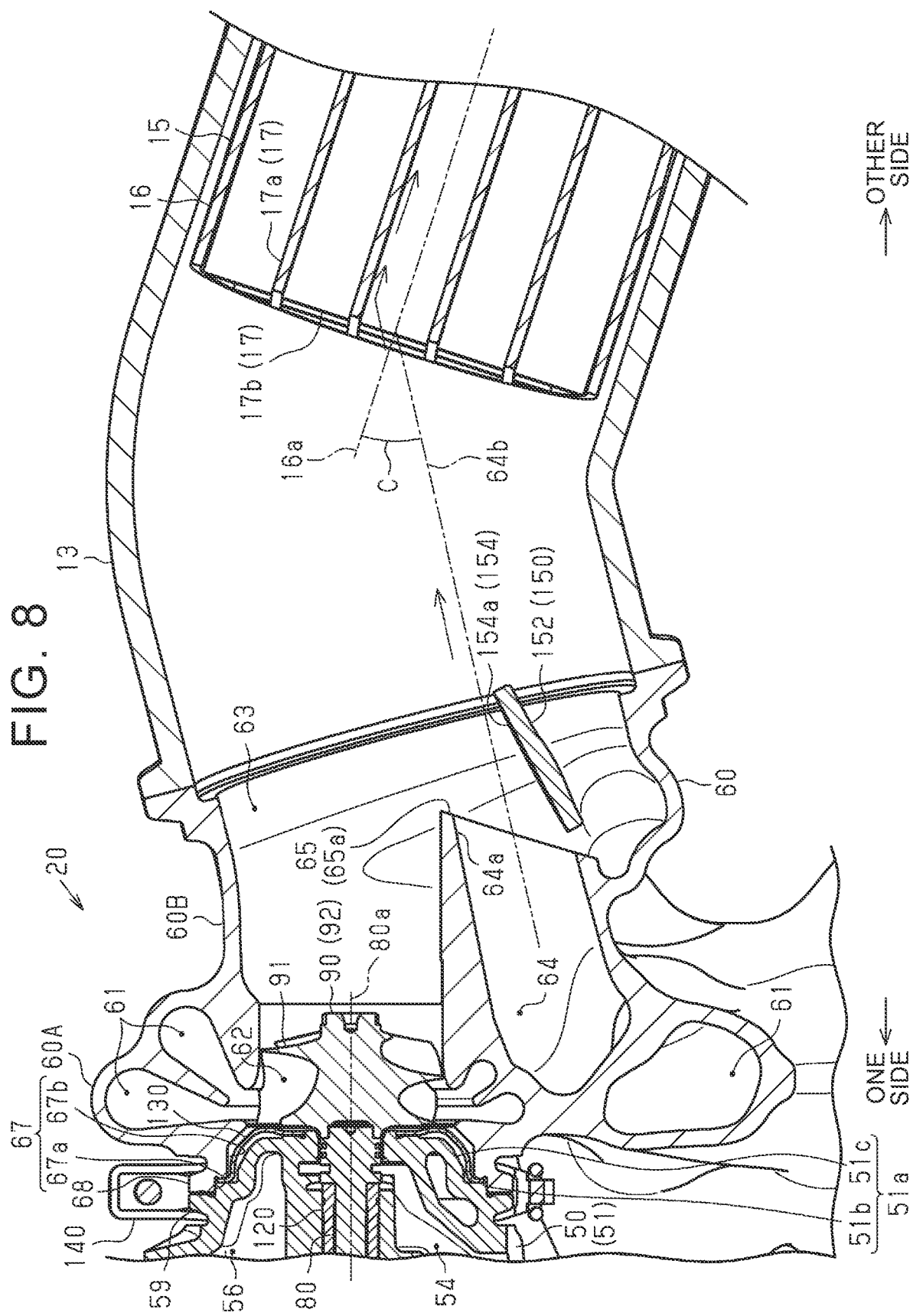
FIG. 8 is a partial cross-sectional view taken along the line VI-VI in FIG. 9.

As shown in FIG. 8, the turbine housing 60 is disposed on the other side of the bearing housing 50 in the rotation axis direction. The turbine housing 60 includes a cylindrical portion 60B and a circular arc portion 60A. The cylindrical portion 60B has a substantially cylindrical shape and extends from the bearing housing 50 toward the other side in the rotation axis direction. The circular arc portion 60A has a substantially circular arc shape and extends so as to surround the cylindrical portion 60B. The circular arc portion 60A surrounds a portion of the cylindrical portion 60B slightly on one side relative to the center portion in the rotation axis direction.

As shown in FIG. 8, a clamp flange portion 68 projects outward in the radial direction of the coupling shaft 80 from an end portion of the outer periphery of the cylindrical portion 60B of the turbine housing 60 at one side in the rotation axis direction. The clamp flange portion 68 extends all around in the circumferential direction of the coupling shaft 80 and is formed in a substantially annular shape. The outside diameter of the clamp flange portion 68 of the turbine housing 60 is substantially equal to the outside diameter of the clamp flange portion 59 of the bearing housing 50.

A V-clamp 140 is attached to the radially outer sides of both the clamp flange portion 68 of the turbine housing 60 and the clamp flange portion 59 of the bearing housing 50. The V-clamp 140 serves as a fixing member. The V-clamp 140 extends in the circumferential direction of the coupling shaft 80 and is formed in a generally annular shape. The V-clamp 140 has a substantially V-shape whose inner side in the radial direction of the coupling shaft 80 is open in cross section perpendicular to the extended direction of the V-clamp 140. The clamp flange portion 68 of the turbine housing 60 and the clamp flange portion 59 of the bearing housing 50 are disposed in the radially inner portion of the V-clamp 140. The clamp flange portion 68 of the turbine housing 60 and the clamp flange portion 59 of the bearing housing 50 are clamped by the V-clamp 140 in the rotation axis direction and fixed to each other. A heat shield plate 130 is disposed between the cylindrical portion 60B of the turbine housing 60 and the body portion 51 of the bearing housing 50. The heat shield plate 130 reduces heat of exhaust gas, flowing through the turbine housing 60, to be transferred to the bearing housing 50.

Figure 5:
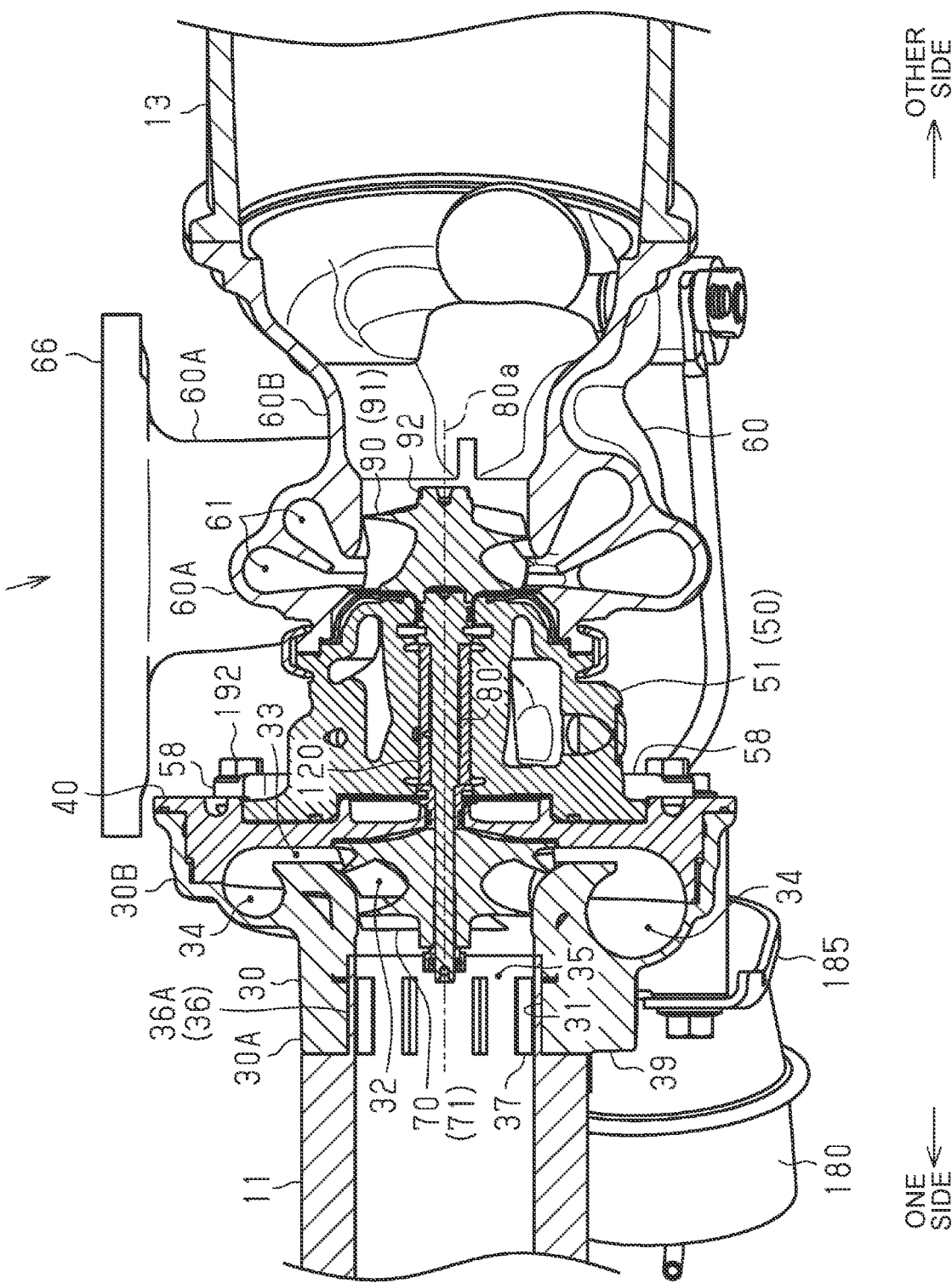
FIG. 5 is a cross-sectional view taken along the line V-V in FIG. 2.

As shown in FIG. 8, scroll passages 61 are defined in the circular arc portion 60A. The scroll passages 61 are used to introduce exhaust gas from the outside of the turbine housing 60. The scroll passages 61 extend in the circumferential direction around the rotation axis 80a of the coupling shaft 80 so as to surround the turbine wheel 90. As shown in FIG. 5, an upstream-side flange portion 66 projects outward in the radial direction of the scroll passages 61 from an extended end portion of the circular arc portion 60A of the turbine housing 60. The exhaust pipe 13 located upstream of the turbine housing 60 is fixed to the upstream-side flange portion 66 by bolts (not shown). In the present embodiment, the two scroll passages 61 are defined inside the circular arc portion 60A, and the two scroll passages 61 are provided side by side in the rotation axis direction.

As shown in FIG. 8, part of the inner space of the cylindrical portion 60B on one side in the rotation axis direction is an accommodation space 62 for accommodating the turbine wheel 90. A central axis of the accommodation space 62 is coaxial with the rotation axis 80a of the coupling shaft 80.

A discharge passage 63 extends toward the other side in the rotation axis direction from an end of the accommodation space 62 at the other side in the rotation axis direction. An end of the discharge passage 63 at the other side in the rotation axis direction reaches an end of the cylindrical portion 60B at the other side in the rotation axis direction and is open to the outer surface of the turbine housing 60. Therefore, exhaust gas introduced into the accommodation space 62 is discharged to the outside of the turbine housing 60 via the discharge passage 63. The exhaust pipe 13 located downstream of the turbine housing 60 is fixed to an end portion of the cylindrical portion 60B of the turbine housing 60 at the other side in the rotation axis direction.

A bypass passage 64 is defined inside the circular arc portion 60A and cylindrical portion 60B of the turbine housing 60. The bypass passage 64 connects an associated one of the scroll passages 61 with the discharge passage 63. In other words, the bypass passage 64 bypasses the turbine wheel 90. The bypass passage 64 extends in a substantially linear shape from the associated scroll passage 61 toward a downstream end of the discharge passage 63. In the present embodiment, the two bypass passages 64 are defined in association with the two scroll passages 61.

Figure 13:
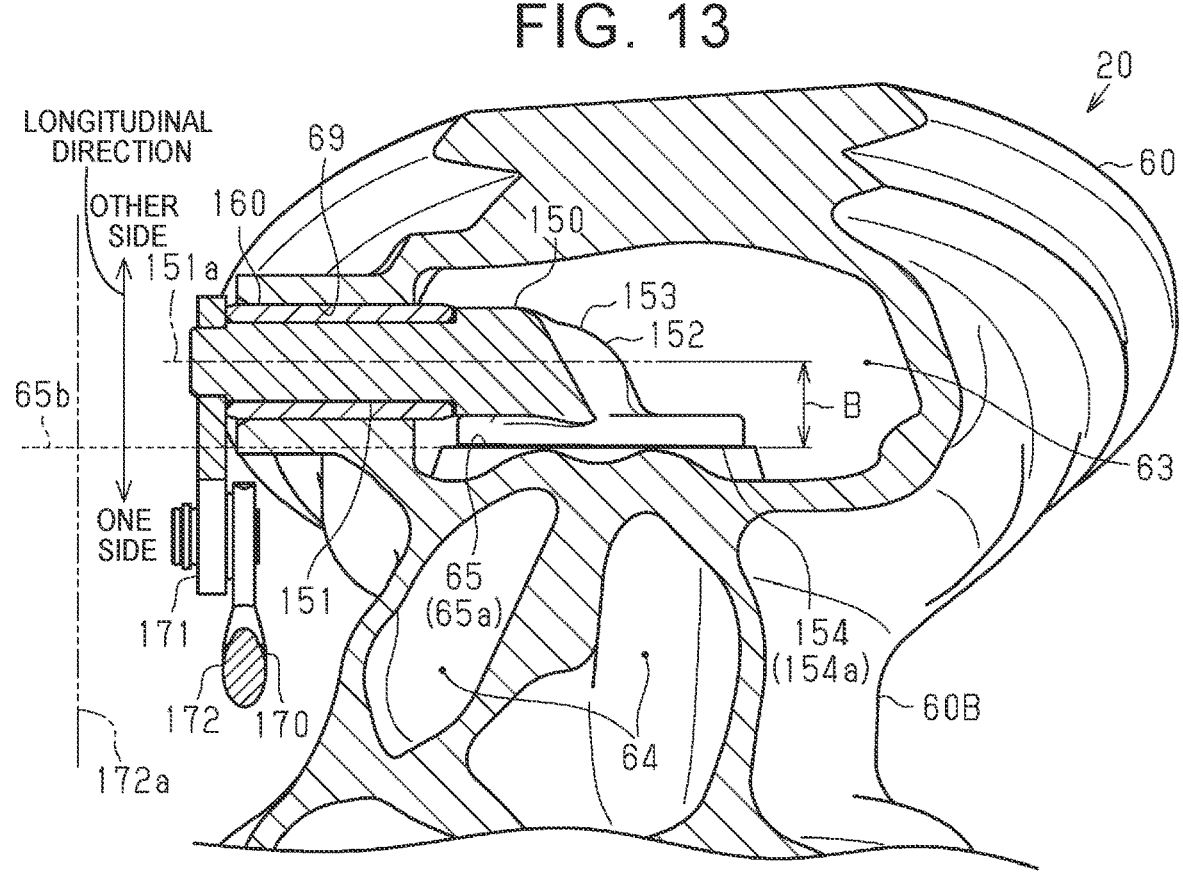
FIG. 13 is a partial cross-sectional view of the turbocharger.

As shown in FIG. 13, a waste gate valve 150 is connected to the turbine housing 60. The waste gate valve 150 is used to open or close an associated one of the bypass passages 64. A shaft 151 of the waste gate valve 150 extends through a wall of the cylindrical portion 60B of the turbine housing 60. The shaft 151 is supported so as to be rotatable relative to the turbine housing 60. A valve element 152 extends radially outward from an end portion of the shaft 151 on an inner side of the turbine housing 60. The valve element 152 is disposed in the discharge passage 63 in the turbine housing 60.

As shown in FIG. 2, one end portion of a link mechanism 170 that transmits driving force is coupled to an end portion of the shaft 151 on an outer side of the turbine housing 60. An actuator 180 is coupled to the other end portion of the link mechanism 170. The actuator 180 is fixed to the circular arc portion 30B of the housing body 39 of the compressor housing 30 via a fixing plate 185. As the driving force of the actuator 180 is transmitted to the waste gate valve 150 via the link mechanism 170, the waste gate valve 150 opens or closes the associated bypass passage 64.

Next, the configurations of portions of the turbocharger 20 will be more specifically described. First, the details of the bearing housing 50, float bearing 120, coupling shaft 80, and other components will be described.

As shown in FIG. 7, the support hole 52 in the bearing housing 50 is roughly divided into a second support hole 52a and a first support hole 52b. The second support hole 52a is located on the other side relative to the oil drain space 54 in the rotation axis direction. The first support hole 52b is located on one side relative to the second support hole 52a in the rotation axis direction. The inside diameter of the first support hole 52b is slightly greater than the outside diameter of the float bearing 120. The size of the first support hole 52b in the rotation axis direction is slightly greater than the size of the float bearing 120 in the rotation axis direction. The float bearing 120 is inserted in the first support hole 52b of the support hole 52. As shown in FIG. 9, one end of the oil introduction passage 53 is connected to the first support hole 52b of the support hole 52.

As shown in FIG. 7, a through-hole 57 is defined in the body portion 51 of the bearing housing 50. The through-hole 57 extends downward from the first support hole 52b of the support hole 52. The lower end of the through-hole 57 is connected to the oil drain space 54. The oil drain port 55 is located in the extended line of the through-hole 57. The inside diameter of a lower portion of the through-hole 57 is greater than the inside diameter of an upper portion of the through-hole 57, and a step is formed at the boundary portion between the lower-side portion and upper-side portion of the through-hole 57.

Figure 10A:
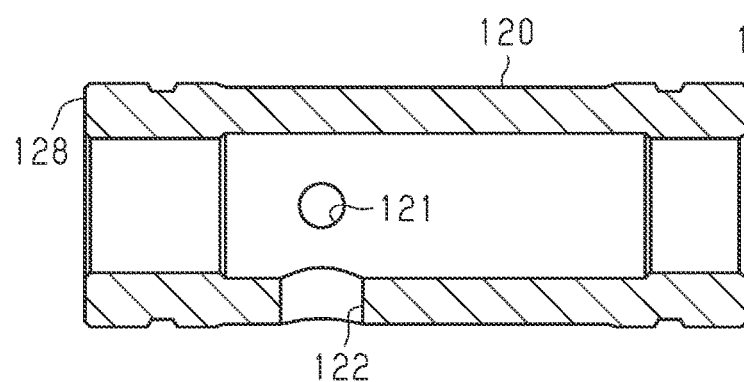
FIG. 10A is a cross-sectional view of a float bearing.

As shown in FIG. 10A, a fixing hole 122 extends through the float bearing 120 in the radial direction of the float bearing 120. A central axis of the fixing hole 122 is coaxial with a central axis of the through-hole 57. As shown in FIG. 7, a fixing pin 129 is inserted in the fixing hole 122 and the through-hole 57, and the float bearing 120 is fixed so as not to be rotatable or movable in the rotation axis direction relative to the body portion 51 of the bearing housing 50. The fixing pin 129 is positioned in the axial direction by the step of the through-hole 57. The top end of the fixing pin 129 is not in contact with the outer periphery of the coupling shaft 80.

Figure 11:
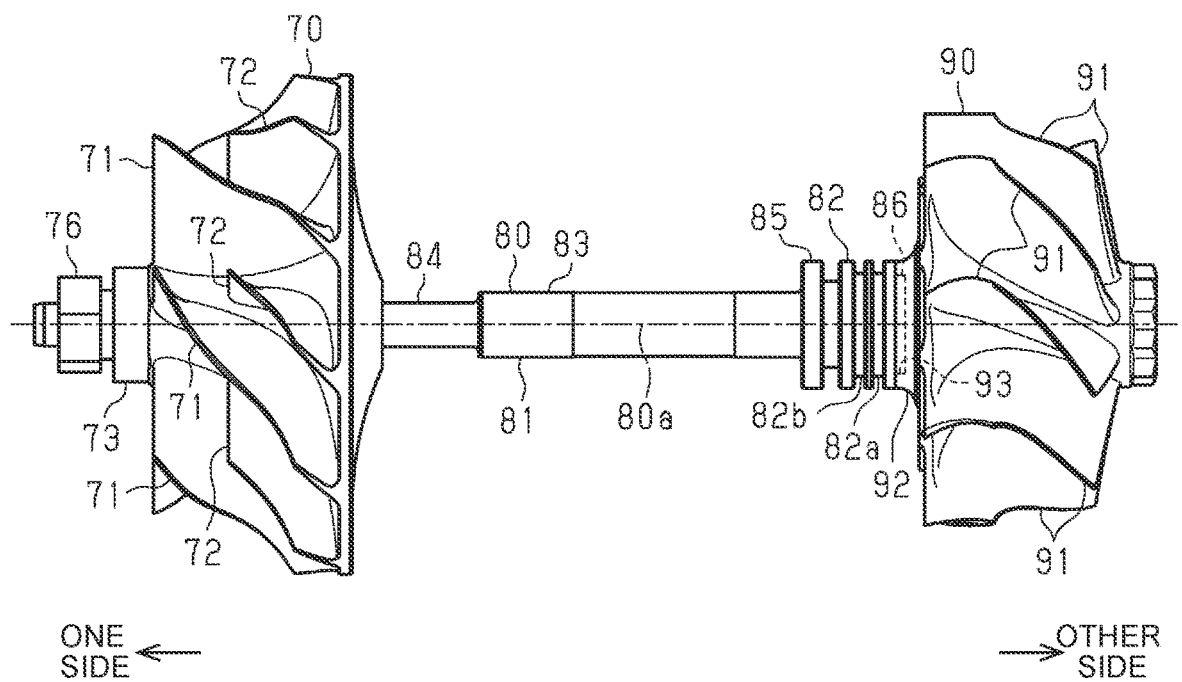
FIG. 11 is a front view of each of a compressor wheel, coupling shaft, and turbine wheel.

As shown in FIG. 11, a shaft body 81 of the coupling shaft 80 extends in the rotation axis direction and has a generally circular rod shape. The shaft body 81 is roughly divided into a large-diameter portion 82, a middle-diameter portion 83 less in outside diameter than the large-diameter portion 82, and a small-diameter portion 84 less in outside diameter than the middle-diameter portion 83, in order from the end at the other side in the rotation axis direction.

The outside diameter of the large-diameter portion 82 is slightly less than the inside diameter of the second support hole 52a of the support hole 52 of the bearing housing 50. The size of the large-diameter portion 82 in the rotation axis direction is substantially equal to the size of the second support hole 52a of the bearing housing 50 in the rotation axis direction.

As shown in FIG. 11, a first recess 82a is recessed inward in the radial direction of the coupling shaft 80 from the outer periphery of the large-diameter portion 82. The first recess 82a annularly extends all around in the circumferential direction of the coupling shaft 80. As shown in FIG. 7, a first seal member 106 is fitted to the first recess 82a. The first seal member 106 reduces flow of exhaust gas inside the turbine housing 60 into the bearing housing 50. The first seal member 106 has a C shape and extends in the circumferential direction of the coupling shaft 80. In this embodiment, the first seal member 106 extends over the range of approximately 359 degrees in the circumferential direction of the coupling shaft 80. In other words, the first seal member 106 is formed in a shape such that part of a ring is cut. The outside diameter of the first seal member 106 is substantially equal to the inside diameter of the second support hole 52a of the support hole 52 of the bearing housing 50.

As shown in FIG. 11, a second recess 82b is recessed inward in the radial direction of the coupling shaft 80 from a portion of the outer periphery of the large-diameter portion 82 on one side relative to the first recess 82a in the rotation axis direction. The second recess 82b annularly extends all around in the circumferential direction of the coupling shaft 80. As shown in FIG. 7, a second seal member 107 is fitted to the second recess 82b. The second seal member 107 reduces flow of exhaust gas inside the turbine housing 60 into the bearing housing 50. The second seal member 107 has a C shape and extends in the circumferential direction of the coupling shaft 80. In this embodiment, the second seal member 107 extends over the range of approximately 359 degrees in the circumferential direction of the coupling shaft 80. In other words, the second seal member 107 is formed in a shape such that part of a ring is cut. The outside diameter of the second seal member 107 is substantially equal to the inside diameter of the second support hole 52a of the support hole 52 of the bearing housing 50.

As shown in FIG. 7, the large-diameter portion 82 of the coupling shaft 80 is inserted in the second support hole 52a of the support hole 52 of the bearing housing 50. Therefore, the first seal member 106 is interposed between the outer periphery of the large-diameter portion 82 of the coupling shaft 80 and the inner periphery of the second support hole 52a of the support hole 52 of the bearing housing 50. The second seal member 107 is interposed between the outer periphery of the large-diameter portion 82 of the coupling shaft 80 and the inner periphery of the second support hole 52a of the support hole 52 of the bearing housing 50, and is placed on one side relative to the first seal member 106 in the rotation axis direction.

When viewed in the rotation axis direction, the second seal member 107 is fitted such that the cut portion of the C shape is placed at a 180-degree symmetrical position to the cut portion of the C shape of the first seal member 106. Therefore, when viewed in the rotation axis direction, at least one of the first seal member 106 and the second seal member 107 is interposed all around in the circumferential direction of the coupling shaft 80.

As described above, the coolant passage 56 is defined in the bearing housing 50. The bearing housing 50 is cooled by heat exchange with coolant flowing through the coolant passage 56. An end of the coolant passage 56 at the other side in the rotation axis direction extends to near the first seal member 106 and the second seal member 107. Specifically, the end of the coolant passage 56 at the other side in the rotation axis direction extends to the other side relative to the second seal member 107 in the rotation axis direction. An end portion of the coolant passage 56 at the other side in the rotation axis direction is defined so as to surround the first seal member 106 and the second seal member 107 from the radially outer side.

The outside diameter of the middle-diameter portion 83 of the coupling shaft 80 is slightly less than the inside diameter of the float bearing 120. The size of the middle-diameter portion 83 in the rotation axis direction is slightly greater than the size of the float bearing 120 in the rotation axis direction. The middle-diameter portion 83 is inserted in the float bearing 120. Therefore, oil is supplied via the supply hole 121 to between the outer periphery of the middle-diameter portion 83 of the coupling shaft 80 and the inner periphery of the float bearing 120. Part of the middle-diameter portion 83 at the other side in the rotation axis direction protrudes from the float bearing 120 toward the other side in the rotation axis direction. A restricting portion 85 projects outward in the radial direction of the coupling shaft 80 from a portion of the middle-diameter portion 83, projecting from the float bearing 120. The restricting portion 85 annularly extends all around in the circumferential direction of the coupling shaft 80. The outside diameter of the restricting portion 85 is slightly less than the inside diameter of the first support hole 52b of the support hole 52 and is substantially equal to the outside diameter of the float bearing 120. In the rotation axis direction, the restricting portion 85 faces an end surface 125 of the float bearing 120 on the other side in the rotation axis direction. The restricting portion 85 of the coupling shaft 80 is located inside the first support hole 52b of the support hole 52.

The outside diameter of the small-diameter portion 84 of the coupling shaft 80 is less than the inside diameter of the insertion hole 41 of the seal plate 40. A generally cylindrical restricting bush 110 is fitted to a middle-diameter portion 83-side end portion of the small-diameter portion 84. An end portion of the restricting bush 110 at the other side in the rotation axis direction is in contact with the step of the boundary portion between the small-diameter portion 84 and the middle-diameter portion 83.

A bush body 111 of the restricting bush 110 has a substantially cylindrical shape and extends in the rotation axis direction. The outside diameter of the bush body 111 is less than the inside diameter of the first support hole 52b of the support hole 52 and is slightly less than the inside diameter of the insertion hole 41 of the seal plate 40. The inside diameter of the bush body 111 is substantially equal to the outside diameter of the small-diameter portion 84 of the coupling shaft 80. The bush body 111 is fixed to the small-diameter portion 84, and rotates integrally with the small-diameter portion 84. In the present embodiment, when one side is viewed from the other side in the rotation axis direction, the coupling shaft 80 rotates toward one side in the circumferential direction (clockwise direction) of the coupling shaft 80.

An annular restricting portion 112 projects outward in the radial direction of the coupling shaft 80 from an end portion of the outer periphery of the bush body 111 at the other side in the rotation axis direction. In other words, the annular restricting portion 112 projects radially outward from the outer periphery of the shaft body 81 of the coupling shaft 80. The annular restricting portion 112 annularly extends all around in the circumferential direction of the coupling shaft 80. The outside diameter of the annular restricting portion 112 is slightly less than the inside diameter of the first support hole 52b of the support hole 52 and is substantially equal to the outside diameter of the float bearing 120. In the rotation axis direction, the annular restricting portion 112 faces an end surface 128 of the float bearing 120 on one side in the rotation axis direction. The annular restricting portion 112 of the coupling shaft 80 is located in the first support hole 52b of the support hole 52.

An annular portion 113 projects outward in the radial direction of the coupling shaft 80 from a substantially center portion of the outer periphery of the bush body 111 in the rotation axis direction. The annular portion 113 annularly extends all around in the circumferential direction of the coupling shaft 80. The annular portion 113 is spaced apart from the annular restricting portion 112 in the rotation axis direction. Therefore, an annular groove 114 that serves as a substantially annular space is defined between the annular portion 113 and the annular restricting portion 112. The annular groove 114 is located in the first support hole 52b of the support hole 52. Therefore, a radially outer side of the annular groove 114 is defined by the inner periphery of the first support hole 52b of the support hole 52.

A first recess 111a is recessed inward in the radial direction of the coupling shaft 80 from an end portion of the outer periphery of the bush body 111 at one side in the rotation axis direction. The first recess 111a annularly extends all over in the circumferential direction of the coupling shaft 80. A first seal ring 101 is fitted to the first recess 111a. The first seal ring 101 reduces flow of intake air inside the compressor housing 30 into the bearing housing 50. The first seal ring 101 has an annular shape. The outside diameter of the first seal ring 101 is substantially equal to the inside diameter of the insertion hole 41 of the seal plate 40.

A second recess 111b is recessed radially inward of the coupling shaft 80 from a portion at the other side relative to the first recess 111a within the end portion of the outer periphery of the bush body 111 at one side in the rotation axis direction. The second recess 111b annularly extends all over in the circumferential direction of the coupling shaft 80. A second seal ring 102 is fitted to the second recess 111b. The second seal ring 102 reduces flow of intake air inside the compressor housing 30 into the bearing housing 50. The second seal ring 102 has an annular shape. The outside diameter of the second seal ring 102 is substantially equal to the inside diameter of the insertion hole 41 of the seal plate 40.

An end portion of the bush body 111 of the restricting bush 110 at one side in the rotation axis direction is inserted in the insertion hole 41 of the seal plate 40. Therefore, the first seal ring 101 is interposed between the outer periphery of the bush body 111 of the restricting bush 110 and the inner periphery of the insertion hole 41 of the seal plate 40. The second seal ring 102 is interposed between the outer periphery of the bush body 111 of the restricting bush 110 and the inner periphery of the insertion hole 41 of the seal plate 40, and is placed on the other side relative to the first seal ring 101 in the rotation axis direction. Part of the small-diameter portion 84 at one side in the rotation axis direction is located in the accommodation space 32 of the compressor housing 30.

Figure 10B:
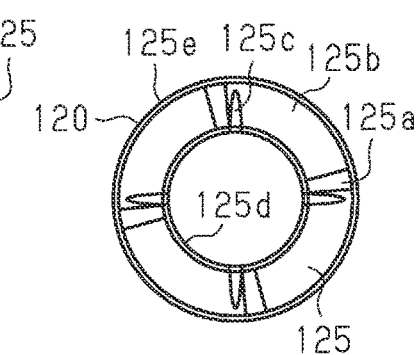
FIG. 10B is a side view of the float bearing.

As shown in FIG. 10B, the end surface 125 of the float bearing 120 is roughly divided into land surfaces 125a and tapered surfaces 125b. The land surfaces 125a face the restricting portion 85 of the coupling shaft 80. The tapered surfaces 125b are inclined relative to the land surfaces 125a.

The land surfaces 125a are flat surfaces perpendicular to the rotation axis 80a of the coupling shaft 80. The four land surfaces 125a are disposed apart from each other in the circumferential direction of the coupling shaft 80. The intervals at which the four land surfaces 125a are arranged are equal intervals in the circumferential direction of the coupling shaft 80. In FIG. 10B, some reference numerals are omitted.

The tapered surfaces 125b each are disposed between the land surfaces 125a in the circumferential direction of the coupling shaft 80. In other words, the four tapered surfaces 125b are disposed in the circumferential direction of the coupling shaft 80. Each tapered surface 125b is next to the land surfaces 125a in the circumferential direction of the coupling shaft 80. In other words, in the circumferential direction of the coupling shaft 80, the land surfaces 125a and the tapered surfaces 125b are connected. The tapered surfaces 125b are recessed in the rotation axis direction relative to the land surfaces 125a. The recessed depth of each tapered surface 125b becomes shallower in the rotation axis direction toward one side in the circumferential direction (clockwise side in FIG. 10B), which is a preceding side in the rotation direction of the coupling shaft 80. In other words, each tapered surface 125b is inclined to approach the restricting portion 85 in the rotation axis direction toward one side in the circumferential direction of the coupling shaft 80. An end of each tapered surface 125b at one side in the circumferential direction of the coupling shaft 80 is flush with the land surface 125a.

A groove 125c is recessed in the rotation axis direction from each tapered surface 125b. The groove 125c is located at an end portion of each tapered surface 125b on the other side (counterclockwise side in FIG. 10B) in the circumferential direction, opposite from the preceding side in the rotation direction of the coupling shaft 80. Each groove 125c linearly extends outward in the radial direction of the coupling shaft 80 from an inner edge 125d of the end surface 125. The depth of the groove 125c becomes shallower toward the outer side in the radial direction of the coupling shaft 80 and becomes zero before reaching a radially outer-side edge of the tapered surface 125b. In other words, an end portion of the groove 125c at the outer side in the radial direction of the coupling shaft 80 has not reached an outer peripheral edge 125e of the end surface 125. Since the end surface 128 of the float bearing 120 has a similar configuration to that of the end surface 125, the description of the end surface 128 of the float bearing 120 is omitted.

As shown in FIG. 7, the oil drain space 54 includes a first end space 54a, a center space 54b, and a second end space 54c. The first end space 54a is located at an end portion at one side in the rotation axis direction. The center space 54b is located at a center portion in the rotation axis direction. The second end space 54c is located at an end portion at the other side in the rotation axis direction. The entire region of the center space 54b is located below the coupling shaft 80.

The first end space 54a reaches above the coupling shaft 80. The first end space 54a lies so as to surround the restricting bush 110 of the coupling shaft 80 from the radially outer side. The first end space 54a has a generally annular shape.

The second end space 54c reaches above the coupling shaft 80. The second end space 54c lies so as to surround a portion of the middle-diameter portion 83 of the coupling shaft 80 on the other side in the rotation axis direction relative to the restricting portion 85 from the radially outer side. The second end space 54c has a generally annular shape.

A first annular space 54d of the oil drain space 54 extends upward from a portion of the center space 54b of the oil drain space 54 at one side. The first annular space 54d is defined so as to surround an end portion of the float bearing 120 at one side in the rotation axis direction from the radially outer side. The first annular space 54d has a generally annular shape. The first annular space 54d is connected to a space defined by the end surface 128 of the float bearing 120 and the annular restricting portion 112 of the restricting bush 110 on the coupling shaft 80.

A second annular space 54e of the oil drain space 54 extends upward from a portion of the center space 54b of the oil drain space 54 at the other side. The second annular space 54e is defined so as to surround an end portion of the float bearing 120 at the other side in the rotation axis direction. The second annular space 54e has a generally annular shape. The second annular space 54e is connected to a space defined by the end surface 125 of the float bearing 120 and the restricting portion 85 of the coupling shaft 80.

Next, the details of the compressor wheel 70, compressor housing 30, and other components, will be described.

As shown in FIG. 11, a shaft portion 73 of the compressor wheel 70 extends in the rotation axis direction and has a generally cylindrical shape. The inside diameter of the shaft portion 73 is substantially equal to the outside diameter of the small-diameter portion 84 of the coupling shaft 80. The small-diameter portion 84 of the coupling shaft 80 is inserted in the shaft portion 73. The shaft portion 73 is fixed to the small-diameter portion 84 of the coupling shaft 80 by a nut 76.

Blades 71 protrude outward in the radial direction of the coupling shaft 80 from the outer periphery of the shaft portion 73. Each blade 71 extends over substantially the entire region of the shaft portion 73 in the rotation axis direction. When one side is viewed from the other side in the rotation axis direction, the blade 71 is curved such that a portion of the blade 71 shifts toward a clockwise side in the circumferential direction of the coupling shaft 80 toward one side in the rotation axis direction. The six blades 71 are disposed apart from each other in the circumferential direction of the coupling shaft 80. The blades 71 are disposed at equal intervals such that the intervals between the blades 71 are equal in the circumferential direction of the coupling shaft 80.

Auxiliary blades 72 protrude outward in the radial direction of the coupling shaft 80 from the outer periphery of the shaft portion 73. Each auxiliary blade 72 is disposed between the blades 71 arranged in the circumferential direction of the coupling shaft 80. In the present embodiment, the six auxiliary blades 72 in total are disposed in association with the number of the blades 71. The auxiliary blade 72 is shorter in length extended in the rotation axis direction than the blade 71. An end of the auxiliary blade 72 at one side in the rotation axis direction is located at the substantially center of the shaft portion 73 in the rotation axis direction. Therefore, the end of the blade 71 at one side in the rotation axis direction is located on one side in the rotation axis direction relative to the end of the auxiliary blade 72 at one side in the rotation axis direction. When one side is viewed from the other side in the rotation axis direction, the auxiliary blade 72 is curved such that a portion of the auxiliary blade 72 shifts toward the clockwise side in the circumferential direction of the coupling shaft 80 toward one side in the rotation axis direction.

Figure 6:
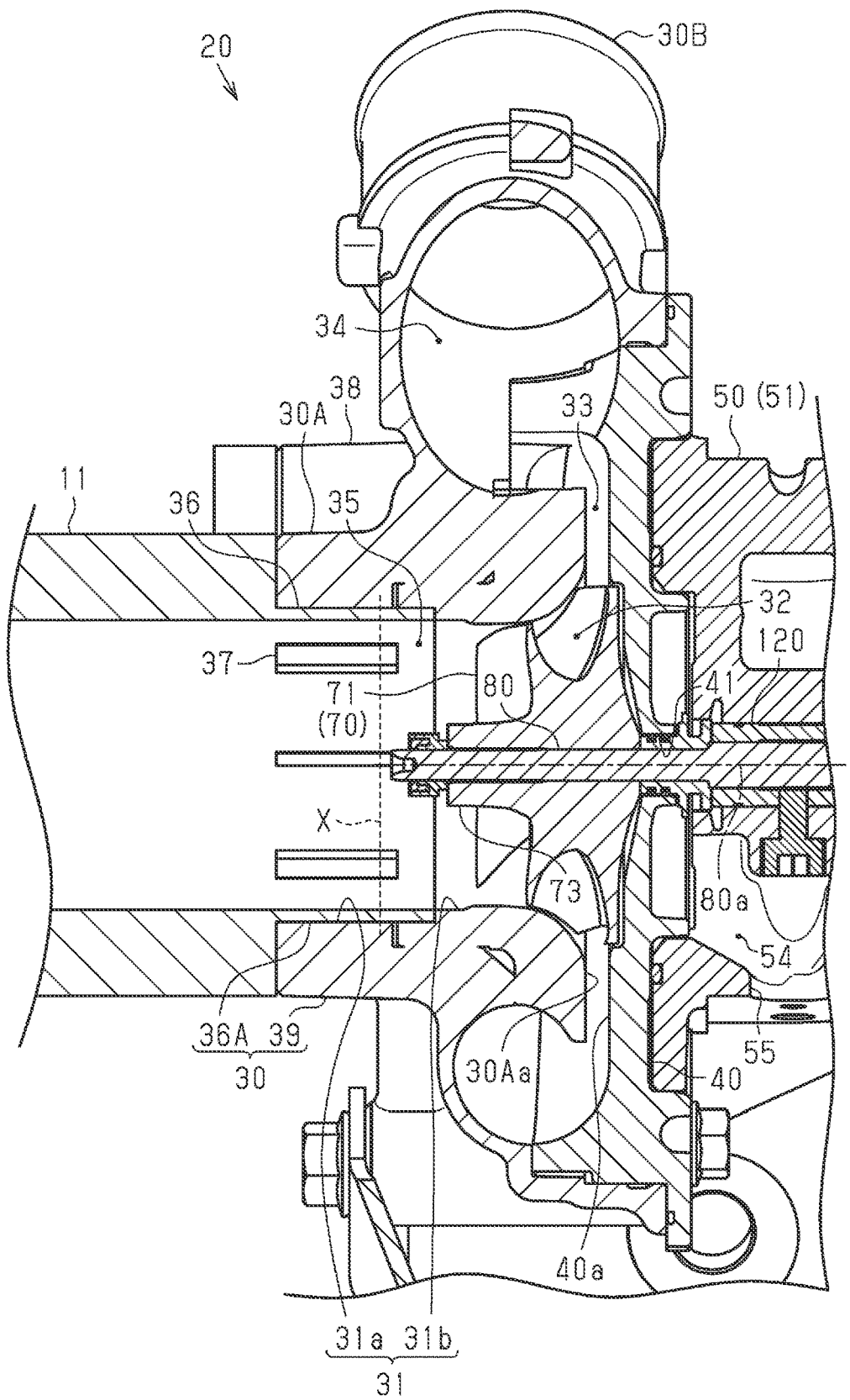
FIG. 6 is a partial cross-sectional view taken along the line VI-VI in FIG. 9.

As shown in FIG. 6, a small-diameter portion 31b of the insertion hole 31 extends from the accommodation space 32 of the housing body 39, in which the compressor wheel 70 is disposed, toward one side in the rotation axis direction. A large-diameter portion 31a of the insertion hole 31 extends from the small-diameter portion 31b toward one side in the rotation axis direction. The large-diameter portion 31a reaches an end portion of the cylindrical portion 30A. In other words, the large-diameter portion 31a of the insertion hole 31 is open to the outside of the housing body 39. The inside diameter of the large-diameter portion 31a is greater than the inside diameter of the small-diameter portion 31b.

An inlet duct 36A is connected to the large-diameter portion 31a of the insertion hole 31. The inlet duct 36A is used to rectify intake air to be introduced to the compressor wheel 70. The inlet duct 36A includes a cylindrical member 36 having a substantially cylindrical shape. The size of the cylindrical member 36 in the rotation axis direction is substantially equal to the size of the large-diameter portion 31a of the housing body 39 in the rotation axis direction. The outside diameter of the cylindrical member 36 is substantially equal to the inside diameter of the large-diameter portion 31a of the housing body 39. The inside diameter of the cylindrical member 36 is substantially equal to the inside diameter of the small-diameter portion 31b of the housing body 39. The cylindrical member 36 is fitted to the large-diameter portion 31a of the housing body 39. The internal space of the cylindrical member 36 functions as an introduction passage 35 together with the internal space of the small-diameter portion 31b of the housing body 39. The introduction passage 35 introduces intake air into the accommodation space 32 of the housing body 39.

As shown in FIG. 6, substantially rectangular plate guide vanes 37 protrude inward in the radial direction of the coupling shaft 80 from an inner wall surface of the cylindrical member 36 (introduction passage 35). The guide vanes 37 extend parallel to the rotation axis direction. Here, in the rotation axis direction, a point to which a distance from an end of the cylindrical member 36 at one side in the rotation axis direction and a distance from an end of each blade 71 at one side in the rotation axis direction are equal is referred to as midpoint X. The guide vanes 37 extend from the end of the cylindrical member 36 at one side in the rotation axis direction to the other side (blade 71 side) in the rotation axis direction relative to the midpoint X. The seven guide vanes 37 are disposed away from each other in the circumferential direction of the coupling shaft 80. In other words, the number (seven) of the guide vanes 37 is a minimum odd number greater than the number (six) of the blades 71. The guide vanes 37 are disposed such that the intervals between the guide vanes 37 are equal in the circumferential direction of the coupling shaft 80. In the present embodiment, the guide vanes 37 are components of a one-piece molding integrated with the cylindrical member 36 by resin molding. In the present embodiment, the inlet duct 36A and the housing body 39 make up the compressor housing 30. The inlet duct 36A is also integrated with the intake pipe 11 upstream of the compressor housing 30 by resin molding.

Next, the details of an assembly structure of the seal plate 40 and bearing housing 50 will be described.

As shown in FIG. 5, support portions 58 protrude outward in the radial direction of the coupling shaft 80 from an end portion of the outer periphery of the body portion 51 of the bearing housing 50 at one side in the rotation axis direction. A surface of each support portion 58 on one side in the rotation axis direction is in contact with a surface of the seal plate 40 on the other side in the rotation axis direction. In other words, the seal plate 40 is in contact with the support portions 58 of the bearing housing 50 from one side in the rotation axis direction. The support portions 58 each have a bolt hole (not shown). The support portions 58 (bearing housing 50) are fixed to the seal plate 40 by bolts 192 inserted in the bolt holes.

As shown in FIG. 9, the three support portions 58 are disposed apart from each other in the circumferential direction of the coupling shaft 80. Here, one (the rightmost support portion 58 in FIG. 9) of the three support portions 58 is referred to as first support portion 58a, and another one (the leftmost support portion 58 in FIG. 9) of the three support portions 58, other than the first support portion 58a, is referred to as second support portion 58b. The other one (the uppermost support portion 58 in FIG. 9) of the three support portions 58, other than the first support portion 58a or the second support portion 58b, is referred to as third support portion 58c. A straight line that is perpendicular to the rotation axis 80a of the coupling shaft 80 and that passes through the center of the first support portion 58a is referred to as imaginary straight line 58d.

The first support portion 58a is located on one side (lower right side in FIG. 9) in a direction along the imaginary straight line 58d relative to the rotation axis 80a of the coupling shaft 80. The second support portion 58b and the third support portion 58c are located on the other side (upper left side in FIG. 9) in the direction along the imaginary straight line 58d relative to the rotation axis 80a of the coupling shaft 80. In other words, in the direction along the imaginary straight line 58d, the first support portion 58a and the second support portion 58b are located on opposite sides relative to the rotation axis 80a of the coupling shaft 80. In the direction along the imaginary straight line 58d, the first support portion 58a and the third support portion 58c are located on opposite sides relative to the rotation axis 80a of the coupling shaft 80.

Next, the details of a coupling structure between the coupling shaft 80 and the turbine wheel 90 will be described.

As shown in FIG. 7, a substantially circular columnar coupling portion 86 extends from an end of the large-diameter portion 82 of the shaft body 81 at the other side in the rotation axis direction toward the other side in the rotation axis direction. The outside diameter of the coupling portion 86 is less than the outside diameter of the large-diameter portion 82. A boundary portion between the large-diameter portion 82 and the coupling portion 86 has a curved surface and has a so-called fillet shape. The turbine wheel 90 is fixed to the coupling portion 86.

As shown in FIG. 11, a shaft portion 92 of the turbine wheel 90 extends in the rotation axis direction and has a generally circular columnar shape. The outside diameter of the shaft portion 92 is greater than the outside diameter of the coupling portion 86 of the coupling shaft 80 and is substantially equal to the outside diameter of the large-diameter portion 82 of the coupling shaft 80.

A substantially circular columnar coupling recess 93 is recessed from an end surface of the shaft portion 92 at one side in the rotation axis direction toward the other side in the rotation axis direction. The inside diameter of the coupling recess 93 is substantially equal to the outside diameter of the coupling portion 86 of the coupling shaft 80. An opening edge of the coupling recess 93 at one side in the rotation axis direction has a chamfered shape. The coupling portion 86 of the coupling shaft 80 is inserted in the coupling recess 93 of the shaft portion 92. In a state where an end surface of the large-diameter portion 82 of the coupling shaft 80 on the other side in the rotation axis direction and an end surface of the shaft portion 92 of the turbine wheel 90 on one side in the rotation axis direction are in contact with each other, the coupling shaft 80 and the turbine wheel 90 are fixed. In the present embodiment, the coupling shaft 80 and the turbine wheel 90 are fixed by welding.

Blades 91 protrude outward in the radial direction of the coupling shaft 80 from the outer periphery of the shaft portion 92. Each blade 91 extends over substantially the entire region of the shaft portion 92 in the rotation axis direction. The nine blades 91 are disposed apart from each other in the circumferential direction of the coupling shaft 80. The blades 91 are disposed at equal intervals such that the intervals between the blades 91 are equal in the circumferential direction of the coupling shaft 80.

Next, the details of a coupling structure between the bearing housing 50 and the turbine housing 60 will be described.

As shown in FIG. 7, the outside diameter of the coupling portion 51a that is an end portion of the body portion 51 of the bearing housing 50 at the other side in the rotation axis direction relative to the clamp flange portion 59 is less than the outside diameter of a portion of the body portion 51 of the bearing housing 50 at one side in the rotation axis direction relative to the clamp flange portion 59. The coupling portion 51a is roughly divided into a coupling large-diameter portion 51b and a coupling small-diameter portion 51c less in outside diameter than the coupling large-diameter portion 51b in order from an end at one side in the rotation axis direction. A step extending all around in the circumferential direction of the coupling shaft 80 is formed at a boundary portion between the coupling large-diameter portion 51b and the coupling small-diameter portion 51c. An end surface of the coupling large-diameter portion 51b that provides the step at the other side in the rotation axis direction functions as a clamping surface 51d. The clamping surface 51d is a flat surface perpendicular to the rotation axis 80a of the coupling shaft 80.

As shown in FIG. 8, a portion of the inner space of the cylindrical portion 60B of the turbine housing 60 at one side in the rotation axis direction relative to the accommodation space 62 serves as a coupling hole 67 into which the coupling portion 51a of the bearing housing 50 is inserted. As shown in FIG. 7, the coupling hole 67 is roughly divided into a coupling large-diameter hole 67a and a coupling small-diameter hole 67b less in inside diameter than the coupling large-diameter hole 67a in order from an end at one side in the rotation axis direction. The inside diameter of the coupling large-diameter hole 67a is substantially equal to the outside diameter of the coupling large-diameter portion 51b of the bearing housing 50. The inside diameter of the coupling small-diameter hole 67b is greater than the outside diameter of the coupling small-diameter portion 51c of the bearing housing 50. A step extending all around in the circumferential direction of the coupling shaft 80 is formed at a boundary portion between the coupling large-diameter hole 67a and the coupling small-diameter hole 67b. An end surface of the coupling small-diameter hole 67b that provides the step on one side in the rotation axis direction functions as a clamping surface 67d. The clamping surface 67d is a flat surface perpendicular to the rotation axis 80a of the coupling shaft 80. The coupling portion 51a of the bearing housing 50 is inserted in the coupling hole 67 of the turbine housing 60.

The generally annular heat shield plate 130 is disposed between the coupling portion 51a of the bearing housing 50 and the coupling hole 67 of the turbine housing 60. An outer peripheral portion 133 that is a radially outer portion of the heat shield plate 130 has a flat annular shape. The diameter of the outer peripheral edge of the outer peripheral portion 133 is less than the inside diameter of the coupling large-diameter hole 67a of the coupling hole 67 of the turbine housing 60. The outer peripheral portion 133 is sandwiched between the clamping surface 51d of the coupling portion 51a of the bearing housing 50 and the clamping surface 67d of the coupling hole 67 of the turbine housing 60 in the thickness direction of the outer peripheral portion 133. As described above, the outer peripheral portion 133 has an annular plate shape, so the entire range of the outer peripheral portion 133 in the circumferential direction of the coupling shaft 80 is sandwiched between the clamping surface 51d of the coupling portion 51a of the bearing housing 50 and the clamping surface 67d of the coupling hole 67 of the turbine housing 60.

The diameter of the inner edge of the outer peripheral portion 133 is less than the diameter of the inner edge of the clamping surface 67d of the turbine housing 60. A curved portion 132 extends from the inner edge of the outer peripheral portion 133 toward the other side in the rotation axis direction. The curved portion 132 is curved such that a portion of the curved portion 132 shifts toward the inner side in the radial direction of the coupling shaft 80 toward the other side in the rotation axis direction. The curved portion 132 extends from the entire inner edge of the outer peripheral portion 133. An inner peripheral portion 131 extends inward in the radial direction of the coupling shaft 80 from the inner edge of the curved portion 132. The inner peripheral portion 131 extends from the entire inner edge of the curved portion 132 and has an annular plate shape. In a state where the outer peripheral portion 133 of the heat shield plate 130 is sandwiched, the curved portion 132 is elastically deformed in the rotation axis direction, and the inner peripheral portion 131 is in contact with an end portion of the coupling portion 51a of the bearing housing 50 at the other side in the rotation axis direction. The inner peripheral portion 131 of the heat shield plate 130 is disposed between the coupling portion 51a of the bearing housing 50 and the blades 91 of the turbine wheel 90.

A facing surface 59a that is an end surface of the clamp flange portion 59 of the bearing housing 50 on the other side in the rotation axis direction is perpendicular to the rotation axis 80a of the coupling shaft 80. A facing surface 68a that is an end surface of the clamp flange portion 68 of the turbine housing 60 on one side in the rotation axis direction is perpendicular to the rotation axis 80a of the coupling shaft 80. The facing surface 59a of the clamp flange portion 59 of the bearing housing 50 and the facing surface 68a of the clamp flange portion 68 of the turbine housing 60 face each other in the rotation axis direction. In all the region in which the facing surface 59a of the clamp flange portion 59 of the bearing housing 50 and the facing surface 68a of the clamp flange portion 68 of the turbine housing 60 face in the rotation axis direction, both are spaced apart from each other in the rotation axis direction, and there is a gap between the facing surfaces 59a, 68a.

Next, the details of the bypass passages 64 of the turbine housing 60 and the waste gate valve 150 will be described.

As shown in FIG. 8, in the turbine housing 60, the two bypass passages 64 are defined (only one bypass passage 64 is shown in FIG. 8) in association with the two scroll passages 61. The two bypass passages 64 are open toward the inside of the turbine housing 60, and the opening positions of the bypass passages 64 are disposed side by side. A valve seat 65 is provided so as to surround the opening edge of an outlet portion 64a of each bypass passage 54 on the inner wall surface of the turbine housing 60. In the present embodiment, the valve seat 65 has a cylindrical shape that protrudes from the inner wall surface of the turbine housing 60, and the outlet portion 64a of each of the two bypass passages 64 is defined on the inner side of the valve seat 65. A contact surface 65a that is an end surface of the valve seat 65 has a flat surface.

As shown in FIG. 13, a through-hole 69 extends through the wall of the cylindrical portion 60B of the turbine housing 60. The through-hole 69 is located downstream (on the other side in the rotation axis direction) of the valve seat 65 of the turbine housing 60. A central axis of the through-hole 69 is parallel to the contact surface 65a of the valve seat 65. A cylindrical bush 160 is inserted in the through-hole 69. The outside diameter of the bush 160 is substantially equal to the inside diameter of the through-hole 69. A central axis of the bush 160 is coaxial with the central axis of the through-hole 69.

As shown in FIG. 13, the waste gate valve 150 is connected to the turbine housing 60. The waste gate valve 150 opens or closes the bypass passages 64. The shaft 151 of the waste gate valve 150 has a substantially circular columnar shape. The outside diameter of the shaft 151 is substantially equal to the inside diameter of the bush 160. The shaft 151 is inserted in the bush 160 and is supported so as to be rotatable relative to the turbine housing 60. A rotation axis 151a of the shaft 151 is coaxial with the central axis of the through-hole 69. As described above, the through-hole 69 is located downstream of the valve seat 65 in the turbine housing 60, so the rotation axis 151a of the shaft 151 is located apart from the contact surface 65a of the valve seat 65 on the downstream side of flow of exhaust gas through the bypass passage 64 in a direction perpendicular to the contact surface 65a of the valve seat 65.

A connecting portion 153 of the valve element 152 extends outward in the radial direction of the shaft 151 from the end portion of the shaft 151 on the inner side of the turbine housing 60. As shown in FIG. 12C, a substantially disc-shaped valve main body 154 is connected to one side of the connecting portion 153 in the circumferential direction of the shaft 151. A surface of the valve main body 154 on the opposite side from the connecting portion 153 intersects with the circumferential direction of the shaft 151 and functions as a contact surface 154a that is brought into contact with the valve seat 65 of the turbine housing 60. The contact surface 154a of the valve main body 154 is a flat surface over the entire region. The size of the connecting portion 153 in the direction perpendicular to the contact surface 154a of the valve main body 154 increases toward the shaft 151 (left side in FIG. 12C). In the present embodiment, the shaft 151 and the valve element 152 are integrated by molding. Therefore, the waste gate valve 150 is a one-piece molding in which the shaft 151 and the valve element 152 are integrated.

As shown in FIG. 2, the link mechanism 170 is coupled to the end portion of the shaft 151 of the waste gate valve 150 on the outer side of the turbine housing 60. Specifically, one end portion of a substantially rectangular parallelepiped plate link arm 171 is coupled to the shaft 151. One end portion of a generally rod-shaped link rod 172 is coupled to the other end portion of the link arm 171. Therefore, in the radial direction of the shaft 151, a center of coupling 177 between the link rod 172 and the link arm 171 is located apart from a center of coupling 176 between the link arm 171 and the shaft 151. The link rod 172 generally extends from the other side toward one side in the rotation axis direction. The output shaft of the actuator 180 is coupled to the other end portion of the link rod 172.

As shown in FIG. 2, as the link rod 172 is actuated toward one side (left side in FIG. 2) in the longitudinal direction of the link rod 172 by the actuator 180, the link arm 171 converts the motion of the link rod 172 to rotational motion and rotates toward one side (counterclockwise side in FIG. 2) in the circumferential direction of the shaft 151. The waste gate valve 150 rotates toward one side in the circumferential direction of the shaft 151. As a result, the contact surface 154a of the valve element 152 of the waste gate valve 150 contacts the contact surface 65a of the valve seat 65 of the turbine housing 60. The downstream end of the bypass passage 64 is covered with the valve element 152 of the waste gate valve 150, so the bypass passage 64 is placed in a fully closed state. In the present embodiment, the state where the contact surface 154a of the valve element 152 contacts the contact surface 65a of the valve seat 65 and the waste gate valve 150 cannot rotate any more toward the closing side is the fully closed state. In the present embodiment, as shown in FIG. 13, in the fully closed state of the bypass passage 64, an imaginary straight line 172a along the longitudinal direction of the link rod 172 intersects with an imaginary plane 65b parallel to the contact surface 65a of the valve seat 65.

On the other hand, as shown in FIG. 2, as the link rod 172 is actuated toward the other side (right side in FIG. 2) in the longitudinal direction of the link rod 172 by the actuator 180, the link arm 171 converts the motion of the link rod 172 to rotational motion, and rotates toward the other side in the circumferential direction of the shaft 151 (clockwise side in FIG. 2). The waste gate valve 150 rotates toward the other side in the circumferential direction of the shaft 151. As a result, the contact surface 154a of the valve element 152 of the waste gate valve 150 moves away from the contact surface 65a of the valve seat 65 of the turbine housing 60. The downstream end of the bypass passage 64 is not covered with the valve element 152 of the waste gate valve 150, so the bypass passage 64 is placed in an open state.

Figure 12A:
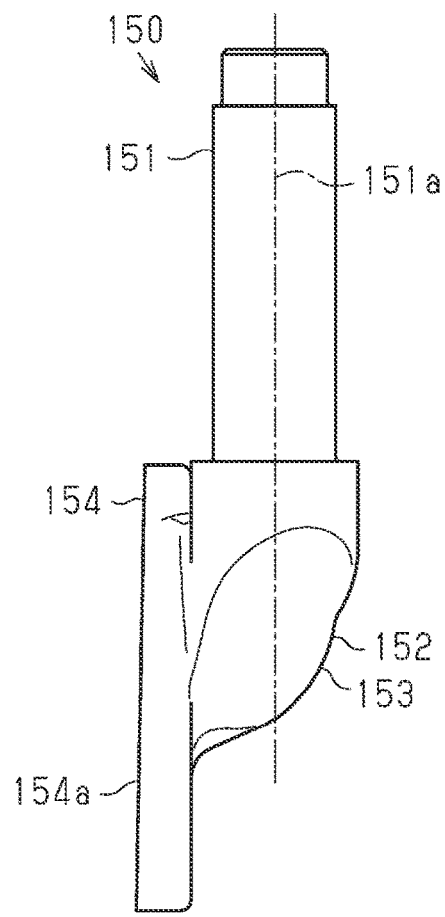
FIG. 12A is a side view of a waste gate valve.

As shown in FIG. 12A, the contact surface 154a of the valve element 152 is inclined such that a portion of the contact surface 154a shifts toward the outer side in the radial direction of the shaft 151 (left side in FIG. 12A) relative to the rotation axis 151a of the shaft 151 as the position of the contact surface 154a comes away from the link arm 171 in the direction of the rotation axis 151a (downward in FIG. 12A), which is the direction along the rotation axis 151a of the shaft 151. Therefore, in the fully closed state of the bypass passage 64, the contact surface 154a of the valve element 152 is inclined such that a portion of the contact surface 154a shifts toward one side in the longitudinal direction of the link rod 172 (side where the valve seat 65 is located) relative to the rotation axis 151a of the shaft 151 as the position of the contact surface 154a comes away from the link arm 171 in the direction of the rotation axis 151a, which is the direction along the rotation axis 151a of the shaft 151. In the present embodiment, the contact surface 154a of the valve element 152 is inclined relative to the rotation axis 151a of the shaft 151 at an angle of one degree or less. FIG. 12A exaggeratedly shows the inclination of the contact surface 154a of the valve element 152 relative to the rotation axis 151a of the shaft 151.

In a cross section perpendicular to the rotation axis 151a of the shaft 151 and intersecting with the contact surface 65a of the valve seat 65, as shown in FIG. 12C, the longest distance from the contact surface 154a of the valve element 152 to the rotation axis 151a of the shaft 151 in the direction perpendicular to the contact surface 154a of the valve element 152 is defined as distance A. In the cross section perpendicular to the rotation axis 151a of the shaft 151 and intersecting with the contact surface 65a of the valve seat 65, as shown in FIG. 13, the shortest distance from the contact surface 65a of the valve seat 65 to the rotation axis 151a of the shaft 151 in the direction perpendicular to the contact surface 65a of the valve seat 65 is defined as distance B. In the present embodiment, the position of the contact surface 154a of the valve main body 154 relative to the contact surface 65a of the valve seat 65 is designed such that the distance A is shorter than the distance B.

Next, the details of the positional relationship between the bypass passage 64 and the catalyst 15 will be described. As shown in FIG. 8, a cylindrical portion 16 of the catalyst 15 linearly extends from the upstream side of the exhaust pipe 13 toward the downstream side. The cylindrical portion 16 has a cylindrical shape. A plurality of partition walls 17 is provided inside the cylindrical portion 16. The partition walls 17 partition the inner space of the cylindrical portion 16. The partition walls 17 extend from the upstream end of the cylindrical portion 16 to the downstream end parallel to a central axis 16a of the cylindrical portion 16. The partition walls 17 are made up of a plurality of first partition walls 17a and a plurality of second partition walls 17b. The first partition walls 17a extend in a first direction perpendicular to the central axis 16a of the cylindrical portion 16. The second partition walls 17b extend in a second direction perpendicular to the first direction. Therefore, when viewed in the direction along the central axis 16a of the cylindrical portion 16, the first partition walls 17a and the second partition walls 17b form a lattice shape. FIG. 8 simply shows the configuration of the catalyst 15 with the reduced number of partition walls 17.

A center portion of an upstream end surface of the catalyst 15 is located in a central axis 64b of the outlet portion 64a of the bypass passage 64. The central axis 64b of the outlet portion 64a of the bypass passage 64 intersects with the first partition walls 17a of the catalyst 15. As shown in FIG. 8, when viewed in a direction perpendicular to the central axis 64b of the outlet portion 64a of the bypass passage 64 and the central axis 16a of the cylindrical portion 16 of the catalyst 15, an angle C of acute angle that the central axis 64b of the outlet portion 64a of the bypass passage 64 makes with the central axis 16a of the cylindrical portion 16 of the catalyst 15 is set to 30 degrees. In the present embodiment, the outlet portions 64a of the two bypass passages 64 extend parallel to each other.

Next, a manufacturing method for welding a contact portion between an end portion of the shaft portion 92 of the turbine wheel 90 at one side in the rotation axis direction and an end portion of the large-diameter portion 82 of the coupling shaft 80 at the other side in the rotation axis direction will be described. First, a welding machine 200 that is used in welding will be described.

Figure 14:
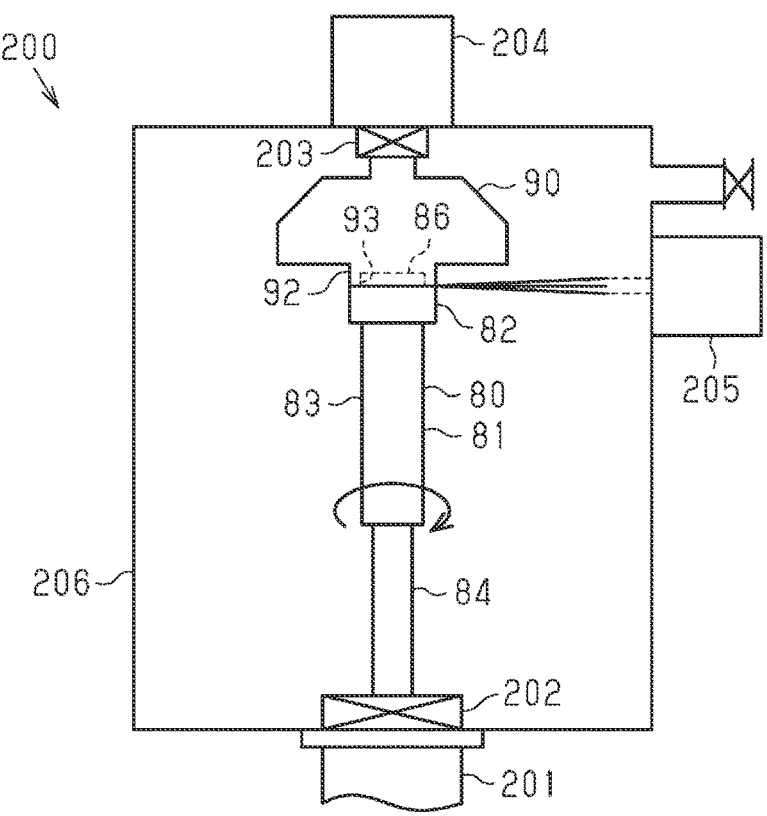
FIG. 14 is a view that illustrates a manufacturing process.

As shown in FIG. 14, the welding machine 200 includes an elevating base 201 for adjusting a position in which the turbine wheel 90 and the coupling shaft 80 are welded. The top surface of the elevating base 201 can be raised or lowered by an actuator (not shown). A lower chuck 202 is provided on the top surface of the elevating base 201. The lower chuck 202 is used to support the end portion of the coupling shaft 80 at one side in the rotation axis direction. The lower chuck 202 is rotatable relative to the elevating base 201. The rotation axis of the lower chuck 202 extends along the up-down direction. A vacuum chamber 206 is mounted on the top surface of the elevating base 201. The vacuum chamber 206 is used to define a vacuum space. Air is discharged from the inside of the vacuum chamber 206, with the result that the inside of the vacuum chamber 206 becomes a substantially vacuum. An upper chuck 203 is provided at the upper portion of the vacuum chamber 206. The upper chuck 203 is used to support the end portion of the turbine wheel 90 at the other side in the rotation axis direction. The upper chuck 203 is located in the rotation axis of the lower chuck 202. The upper chuck 203 is coaxial with the lower chuck 202 and is rotatable relative to the vacuum chamber 206. An electric motor 204 is coupled to the upper chuck 203. The turbine wheel 90 and the coupling shaft 80, supported by the upper chuck 203, are actuated to rotate by the electric motor 204. An electron gun 205 is installed at a side portion of the vacuum chamber 206. The electron gun 205 is used to irradiate electron beam.

Subsequently, a manufacturing method for welding a contact portion between the end portion of the shaft portion 92 of the turbine wheel 90 at one side in the rotation axis direction and the end portion of the large-diameter portion 82 of the coupling shaft 80 at the other side in the rotation axis direction will be specifically described.

First, the coupling portion 86 of the coupling shaft 80 is inserted into the coupling recess 93 of the shaft portion 92 of the turbine wheel 90. After that, the end portion of the coupling shaft 80 at one side (lower side in FIG. 14) in the rotation axis direction is supported by the lower chuck 202, and the end portion of the turbine wheel 90 at the other side (upper side in FIG. 14) in the rotation axis direction is supported by the upper chuck 203. Air is discharged from the inside of the vacuum chamber 206, and the inside of the vacuum chamber 206 is brought to a substantially vacuum state.

Subsequently, the electron gun 205 is disposed on the outer side in the radial direction of the coupling shaft 80 relative to the contact portion between the end portion of the shaft portion 92 of the turbine wheel 90 at one side in the rotation axis direction and the end portion of the large-diameter portion 82 of the coupling shaft 80 at the other side in the rotation axis direction. Electron beam (for example, a current of several milliamperes and a voltage of several tens of kilovolts) is irradiated from the electron gun 205. In a state where electron beam is irradiated by the electron gun 205, the turbine wheel 90 and the coupling shaft 80 are rotated 360 degrees around the rotation axis 80a of the coupling shaft 80 (for example, rotated in several seconds). Thus, temporary welding is performed.

Subsequently, the output of electron beam from the electron gun 205 is increased (for example, a current of several tens of milliamperes and a voltage of several tens of kilovolts). Then, the electron gun 205 is disposed on the outer side in the radial direction of the coupling shaft 80 relative to the contact portion between the end portion of the shaft portion 92 of the turbine wheel 90 at one side in the rotation axis direction and the end portion of the large-diameter portion 82 of the coupling shaft 80 at the other side in the rotation axis direction. After that, electron beam is irradiated from the electron gun 205. In a state where electron beam is irradiated by the electron gun 205, the turbine wheel 90 and the coupling shaft 80 are rotated 360 degrees around the rotation axis 80a of the coupling shaft 80 (for example, rotated in several seconds). Thus, full-scale welding is performed.

Subsequently, the output of electron beam from the electron gun 205 is decreased (for example, a current of several milliamperes and a voltage of several tens of kilovolts). Then, the electron gun 205 is disposed on the outer side in the radial direction of the coupling shaft 80 relative to the contact portion between the end portion of the shaft portion 92 of the turbine wheel 90 at one side in the rotation axis direction and the end portion of the large-diameter portion 82 of the coupling shaft 80 at the other side in the rotation axis direction. After that, electron beam is irradiated from the electron gun 205. In a state where electron beam is irradiated by the electron gun 205, the turbine wheel 90 and the coupling shaft 80 are rotated 360 degrees around the rotation axis 80a of the coupling shaft 80 (for example, rotated in several seconds). Thus, tempering is performed.

In the above-described temporary welding process, the coupling strength between the shaft portion 92 of the turbine wheel 90 and the large-diameter portion 82 of the coupling shaft 80 does not satisfy the coupling strength that can withstand the driving of the turbocharger 20. In the above-described tempering process, the shaft portion 92 of the turbine wheel 90 and the large-diameter portion 82 of the coupling shaft 80 do not melt. For this reason, in the present embodiment, in the above-described full-scale welding process, welding is performed only once to bring the coupling strength between the shaft portion 92 of the turbine wheel 90 and the large-diameter portion 82 of the coupling shaft 80 to a coupling strength that can withstand the driving of the turbocharger 20.

The operation and advantageous effects of the present embodiment will be described. Advantageous effects related to a configuration around the guide vanes 37 will be described. In the turbocharger 20, as the compressor wheel 70 inside the compressor housing 30 rotates, intake air introduced from the intake pipe 11 upstream of the compressor housing 30 to the introduction passage 35 is discharged to the intake pipe 11 downstream of the compressor housing 30 via the accommodation space 32, the connection passage 33, and the scroll passage 34.

As shown in FIG. 6, the substantially rectangular plate guide vanes 37 protrude inward in the radial direction of the coupling shaft 80 from the inner wall surface of the cylindrical member 36 (introduction passage 35) of the compressor housing 30. Therefore, at the radially outer-side portion of the introduction passage 35, intake air does not flow at some portions where the guide vanes 37 are provided in the introduction passage 35 and intake air streams through portions between the adjacent guide vanes 37 in the introduction passage 35, so intake air streams commensurate with the number of the guide vanes 37 occur. As a result, on the downstream side of the guide vanes 37 in the introduction passage 35, the rate of flow of intake air through the portions with intake air streams is high, but the rate of flow of air through the portions with no intake air stream is low. When the rate of flow of intake air varies in the circumferential direction of the introduction passage 35 in this way, high flow rate part of intake air resulting from intake air streams strikes the upstream end portions of the blades 71 of the compressor wheel 70, with the result that vibrations occur in the entire compressor wheel 70.

Here, it is assumed that the number of the guide vanes 37 is seven that is equal to the number of the blades 71 of the compressor wheel 70. In this case, the number of intake air streams commensurate with the number of the guide vanes 37 is seven and is equal to the number of the blades 71 of the compressor wheel 70, so intake air streams flowing toward the downstream side from the introduction passage 35 strike the upstream end portions of the blades 71 of the compressor wheel 70 at substantially the same timing. As a result, vibrations that are generated by intake air streams striking the upstream end portions of the blades 71 overlap one another, so excessively large vibrations may occur in the compressor wheel 70.

In the present embodiment, the number (seven) of the guide vanes 37 is a minimum odd number greater than the number (six) of the blades 71. In other words, the number of the guide vanes 37 is neither equal to the number of the blades 71 of the compressor wheel 70 nor a multiple of the number of the blades 71. Therefore, intake air streams do not strike the upstream end portions of the blades 71 of the compressor wheel 70 at substantially the same timing, so vibrations that are generated by intake air streams striking the upstream ends of the blades 71 do not occur at the same timing. Thus, vibrations that are generated by intake air streams striking the upstream end portions of the blades 71 interfere with one another, and vibrations of the entire compressor wheel 70 tend to attenuate.

The number of the guide vanes 37 is greater than the number of the blades 71, so the number of intake air streams commensurate with the number of the guide vanes 37 increases as compared to the configuration that the number of the guide vanes 37 is less than the number of the blades 71. Therefore, vibrations of the blades 71, which are generated by intake air streams striking the blades 71, are reduced. In addition, the number of the guide vanes 37 is a minimum value among odd numbers greater than the number of the blades 71 and is a necessary minimum number, so an increase in intake air resistance resulting from the guide vanes 37 is minimized.

Ends of the blades 71 at one side (upstream side) in the rotation axis direction are located on one side (upstream side) in the rotation axis direction relative to ends of the auxiliary blades 72 at one side (upstream side) in the rotation axis direction. When intake air flows from the introduction passage 35 to the accommodation space 32, the compressor wheel 70 is rotating, so most of intake air flowing from the introduction passage 35 to the accommodation space 32 strikes the upstream end portions of the blades 71. For this reason, most of vibrations that are generated by intake air streams striking the compressor wheel 70 is generated by intake air streams striking the blades 71. Therefore, the influence of the relationship between the number of the guide vanes 37 and the number of the auxiliary blades 72 on vibrations of the compressor wheel 70 is considerably small. In the present embodiment, the number of the guide vanes 37 is set according to the number of the blades 71, so the number of the guide vanes 37 does not change according to the number of the auxiliary blades 72. Thus, the number of the guide vanes 37 does not increase according to the number of the auxiliary blades 72, and intake air resistance does not increase with an increase in the number of the guide vanes 37 accordingly.

The guide vanes 37 extend from the end of the cylindrical member 36 at one side in the rotation axis direction to the other side (blade 71 side) in the rotation axis direction relative to the midpoint X. Therefore, in the present embodiment, as compared to the configuration that the ends of the guide vanes 37 at the other side in the rotation axis direction are located on one side in the rotation axis direction relative to the midpoint X, the rectification of the guide vanes 37 increases. The distance between the ends of the guide vanes 37 at the other side (downstream side) in the rotation axis direction and the ends of the blades 71 at one side (upstream side) in the rotation axis direction is relatively short, so rectified intake air tends to reach the blades 71 without being diffused. When rectified intake air flows to the blades 71 without being diffused, variations in the rate of flow of intake air in the circumferential direction of the introduction passage 35 increase. Vibrations of the blades 71, which are generated by high flow rate part of intake air striking the blades 71, tend to increase. When the number of the guide vanes 37 is set as described above for such guide vanes 37, the effect of reducing vibrations of the compressor wheel 70 can be further effectively obtained.

The inlet duct 36A is a member different from the housing body 39, and the cylindrical member 36 of the inlet duct 36A is fitted to the large-diameter portion 31a of the housing body 39. The guide vanes 37 and the cylindrical member 36 in the inlet duct 36A are components of a one-piece molding. Therefore, with a simple action of fitting the cylindrical member 36 of the inlet duct 36A to the large-diameter portion 31a of the housing body 39, the guide vanes 37 can be provided inside the compressor housing 30. The guide vanes 37 are not provided on the housing body 39, so complication of the shape of the housing body 39 is suppressed.

Advantageous effects related to a configuration around the coupling shaft 80 will be described. As shown in FIG. 7, the first seal member 106 is interposed between the outer periphery of the large-diameter portion 82 of the coupling shaft 80 and the inner periphery of the support hole 52 of the bearing housing 50. With the first seal member 106, flow of exhaust gas, flowing through the accommodation space 62 of the turbine housing 60, into the oil drain space 54 of the bearing housing 50 is reduced.

Incidentally, depending on the operating condition or other factors of the internal combustion engine 10, the pressure of exhaust gas in the turbine housing 60 can be excessively high. As a result, exhaust gas flowing through the accommodation space 62 of the turbine housing 60 may flow into one side in the rotation axis direction relative to the first seal member 106 between the outer periphery of the large-diameter portion 82 of the coupling shaft 80 and the inner periphery of the support hole 52 of the bearing housing 50.

In the present embodiment, the second seal member 107 is interposed between the outer periphery of the large-diameter portion 82 of the coupling shaft 80 and the inner periphery of the second support hole 52a of the support hole 52 of the bearing housing 50 on one side relative to the first seal member 106 in the rotation axis direction. Therefore, as described above, even when exhaust gas flows into one side relative to the first seal member 106 in the rotation axis direction between the outer periphery of the large-diameter portion 82 of the coupling shaft 80 and the inner periphery of the support hole 52 of the bearing housing 50, flow of exhaust gas into one side relative to the second seal member 107 in the rotation axis direction is reduced.

The first seal member 106 and the second seal member 107 extend over the range of approximately 359 degrees in the circumferential direction of the coupling shaft 80 and partially have a cutout. Therefore, exhaust gas may flow into one side relative to the first seal member 106 in the rotation axis direction via a gap of the cutout portion of the first seal member 106 between the outer periphery of the large-diameter portion 82 of the coupling shaft 80 and the inner periphery of the support hole 52 of the bearing housing 50.

In the present embodiment, when viewed in the rotation axis direction, at least one of the first seal member 106 and the second seal member 107 is interposed all around in the circumferential direction of the coupling shaft 80. The first seal member 106 and the second seal member 107 are located on opposite sides of the coupling shaft 80 relative to each other in this way. Therefore, even when exhaust gas flows into one side in the rotation axis direction relative to the first seal member 106 via the gap of the cutout portion of the first seal member 106, flow of exhaust gas is suppressed by the second seal member 107.

Particularly, in the present embodiment, when viewed in the rotation axis direction, the second seal member 107 is mounted such that the cutout portion of the C shape of the second seal member 107 and the cutout portion of the C shape of the first seal member 106 are located symmetrically with respect to each other. Therefore, the distance from the cutout portion of the C shape of the first seal member 106 to the cutout portion of the C shape of the second seal member 107 between the outer periphery of the large-diameter portion 82 of the coupling shaft 80 and the inner periphery of the support hole 52 of the bearing housing 50 is easily increased.

In the present embodiment, the first seal member 106 is disposed on the other side relative to the second seal member 107 in the rotation axis direction, so the first seal member 106 is easily exposed to exhaust gas as compared to the second seal member 107. Therefore, the first seal member 106 can deteriorate under the influence of the heat of exhaust gas.

As shown in FIG. 7, the end of the coolant passage 56 of the bearing housing 50 at the other side in the rotation axis direction extends to the other side relative to the second seal member 107 in the rotation axis direction. Therefore, by heat exchange with coolant flowing through the coolant passage 56, not only a portion of the bearing housing 50 near the second seal member 107 but also a portion of the bearing housing 50 near the first seal member 106 is cooled. As a result, the first seal member 106 and the second seal member 107, disposed inside the support hole 52 of the bearing housing 50, are cooled. Thus, an excessive increase in the temperature of the first seal member 106 and the second seal member 107 is avoided, so deterioration of the first seal member 106 and the second seal member 107 is curbed.

Advantageous effects related to a configuration around the float bearing 120 will be described. As shown in FIG. 7, in the rotation axis direction, the restricting portion 85 of the coupling shaft 80 faces the end surface 125 of the float bearing 120 on the other side in the rotation axis direction. As the restricting portion 85 of the coupling shaft 80 contacts the end surface 125 of the float bearing 120 while the coupling shaft 80 is rotating, the restricting portion 85 or the end surface 125 of the float bearing 120 may wear.

In the present embodiment, part of oil supplied to between the outer periphery of the coupling shaft 80 and the inner periphery of the float bearing 120 flows to between the restricting portion 85 of the coupling shaft 80 and the end surface 125 of the float bearing 120. Therefore, while the coupling shaft 80 is rotating, oil present between the end surface 125 of the float bearing 120 and the restricting portion 85 of the coupling shaft 80 is dragged by the rotation of the restricting portion 85 of the coupling shaft 80 and flows toward the preceding side in the rotation direction of the coupling shaft 80.

Each of the tapered surfaces 125b of the end surface 125 of the float bearing 120 is inclined so as to approach the restricting portion 85 in the rotation axis direction toward one side in the circumferential direction of the coupling shaft 80. In other words, a clearance in the rotation axis direction between each tapered surface 125b of the float bearing 120 and the restricting portion 85 of the coupling shaft 80 reduces toward the preceding side in the rotation direction of the coupling shaft 80. Therefore, as oil is dragged by the rotation of the restricting portion 85 of the coupling shaft 80 to flow, oil attempts to flow into small-clearance portions, so the pressure of oil at the small-clearance portions increases. The pressure of oil between each tapered surface 125b of the float bearing 120 and the restricting portion 85 of the coupling shaft 80 increases in this way, with the result that a gap can be ensured between the end surface 125 of the float bearing 120 and the restricting portion 85 of the coupling shaft 80. As a result, wearing of the end surface 125 of the float bearing 120 and the restricting portion 85 of the coupling shaft 80 resulting from contact therebetween is reduced.

On the end surface 125 of the float bearing 120, the four land surfaces 125a and the four tapered surfaces 125b are provided apart from each other in the circumferential direction of the coupling shaft 80. Therefore, there are four portions where the pressure of oil increases between the tapered surface 125b of the float bearing 120 and the restricting portion 85 of the coupling shaft 80 at equal intervals in the circumferential direction. As a result, an inclination of the coupling shaft 80 relative to the float bearing 120 due to the pressure of oil that acts on the restricting portion 85 of the coupling shaft 80 is suppressed.

Each of the grooves 125c on the end surface 125 of the float bearing 120 extends outward in the radial direction of the coupling shaft 80 from the inner edge 125d of the end surface 125. For this reason, oil between the outer periphery of the coupling shaft 80 and the inner periphery of the float bearing 120 can be supplied to between each tapered surface 125*b* of the float bearing 120 and the restricting portion 85 of the coupling shaft 80 via an associated one of the grooves 125*c*. Therefore, a shortage of oil that is supplied to between the tapered surfaces 125*b* of the float bearing 120 and the restricting portion 85 of the coupling shaft 80 is restrained.

The grooves 125*c* on the end surface 125 of the float bearing 120 do not reach the outer peripheral edge 125*e* of the end surface 125. Therefore, oil flowing into the grooves 125*c* of the float bearing 120 is difficult to flow radially outward beyond the outer peripheral edge 125*e* of the end surface 125 via the grooves 125*c*. Thus, a reduction in the amount of oil that is supplied to between each tapered surface 125*b* of the float bearing 120 and the restricting portion 85 of the coupling shaft 80 via an associated one of the grooves 125*c* is suppressed.

Each of the grooves 125*c* of the end surface 125 of the float bearing 120 is located at an end portion of the tapered surface 125*b* at the other side (counterclockwise side in FIG. 10B) in the circumferential direction, opposite from the preceding side in the rotation direction of the coupling shaft 80. In other words, each groove 125*c* is located at a portion where the pressure of oil is relatively low between the tapered surface 125*b* of the float bearing 120 and the restricting portion 85 of the coupling shaft 80. Therefore, in the present embodiment, as compare to the configuration that each groove 125*c* is located at an end portion of the tapered surface 125*b* at one side (clockwise side in FIG. 10B) in the circumferential direction, which is the preceding side in the rotation direction of the coupling shaft 80, oil flowing into the groove 125*c* is easily supplied to between the tapered surface 125*b* of the float bearing 120 and the restricting portion 85 of the coupling shaft 80.

In the present embodiment, the end surface 128 of the float bearing 120 on one side in the rotation axis direction has a similar configuration to the end surface 125 of the float bearing 120 on the other side in the rotation axis direction. The end surface 128 of the float bearing 120 faces the annular restricting portion 112 of the restricting bush 110 on the coupling shaft 80. Since the restricting bush 110 rotates integrally with the shaft body 81, while the coupling shaft 80 is rotating, oil present between the end surface 128 of the float bearing 120 and the annular restricting portion 112 of the restricting bush 110 is dragged by the rotation of the annular restricting portion 112 of the restricting bush 110 and flows toward the preceding side in the rotation direction of the coupling shaft 80. Thus, a gap is ensured between the end surface 128 of the float bearing 120 and the annular restricting portion 112 of the restricting bush 110 on the coupling shaft 80.

The float bearing 120 is not rotatable and not movable in the rotation axis direction relative to the bearing housing 50 by the fixing pin 129 inserted in the fixing hole 122 of the float bearing 120. Therefore, for example, a configuration for fixing the float bearing 120 to the bearing housing 50 need not be provided on the end surface 128 of the float bearing 120 on one side in the rotation axis direction. Thus, as described above, a similar configuration to the end surface 125 of the float bearing 120 on the other side in the rotation axis direction is employed for the end surface 128 of the float bearing 120 on one side in the rotation axis direction.

As described above, a configuration for fixing the float bearing 120 to the bearing housing 50 need not be employed for the end surface 128 of the float bearing 120 on one side in the rotation axis direction. Therefore, a thrust bearing, or the like, for supporting the end surface 128 of the float bearing 120 need not be installed at a portion of the body portion 51 of the bearing housing 50 at one side in the rotation axis direction. Thus, a structure for installing a thrust bearing, or the like, need not be employed for the portion of the body portion 51 of the bearing housing 50 at one side in the rotation axis direction, so the flexibility of design of the portion of the body portion 51 of the bearing housing 50 at one side in the rotation axis direction is improved. In the present embodiment, the first end space 54*a* of the oil drain space 54 is defined in a generally annular shape at the portion of the body portion 51 of the bearing housing 50 at one side in the rotation axis direction. Thus, oil inside the first end space 54*a* is quickly drained via the center space 54*b* from the oil drain port 55 to the outside of the bearing housing 50.

The second annular space 54*e* of the oil drain space 54 of the bearing housing 50 is defined so as to surround the end portion of the float bearing 120 at the other side in the rotation axis direction from the radially outer side. The second annular space 54*e* of the oil drain space 54 is connected to the space between the end surface 125 of the float bearing 120 and the restricting portion 85 of the coupling shaft 80. Therefore, oil supplied to between the end surface 125 of the float bearing 120 and the restricting portion 85 of the coupling shaft 80 flows outward in the radial direction of the coupling shaft 80 and reaches the second annular space 54*e* of the oil drain space 54. Then, the oil is drained to the outside of the bearing housing 50 via the oil drain space 54 and the oil drain port 55. Thus, stagnation of oil between the end surface 125 of the float bearing 120 and the restricting portion 85 of the coupling shaft 80 is reduced. As a result, interference with flow of oil between the end surface 125 of the float bearing 120 and the restricting portion 85 of the coupling shaft 80 due to stagnation of oil is reduced. With the first annular space 54*d* of the oil drain space 54, stagnation of oil between the end surface 128 of the float bearing 120 and the annular restricting portion 112 of the restricting bush 110 on the coupling shaft 80 is reduced.

The amount of oil flowing from between the end surface 128 of the float bearing 120 and the annular restricting portion 112 of the restricting bush 110 on the coupling shaft 80 to the first annular space 54*d* of the oil drain space 54 can excessively increase. When the amount of oil flowing to the first annular space 54*d* is large in this way, the pressure of oil in the first annular space 54*d* can increase. As a result, oil in the first annular space 54*d* can flow toward one side in the rotation axis direction via between the inner periphery of the first support hole 52*b* of the support hole 52 of the bearing housing 50 and the outer periphery of the annular restricting portion 112 of the restricting bush 110 on the coupling shaft 80. Since the pressure of oil flowing toward one side in the rotation axis direction is also increased in this way, oil may flow into the accommodation space 32 of the compressor housing 30 via between the inner periphery of the insertion hole 41 of the seal plate 40 and the outer periphery of the bush body 111 of the restricting bush 110 on the coupling shaft 80.

In the present embodiment, the annular groove 114 is defined as a substantially annular space between the annular portion 113 and annular restricting portion 112 of the restricting bush 110. Therefore, oil flowing toward one side in the rotation axis direction via between the inner periphery of the first support hole 52*b* of the support hole 52 of the bearing housing 50 and the outer periphery of the annular restricting portion 112 of the restricting bush 110 on the coupling shaft 80 is introduced into the annular groove 114 of the restricting bush 110. When oil is introduced into the annular groove 114 of the restricting bush 110 in this way, the pressure of oil flowing toward one side in the rotation axis direction decreases. Thus, flow of oil into the accommodation space 32 of the compressor housing 30 via between the inner periphery of the insertion hole 41 of the seal plate 40 and the outer periphery of the bush body 111 of the restricting bush 110 on the coupling shaft 80 is reduced.

Advantageous effects related to a configuration around the seal plate 40 will be described. If the bearing housing 50 does not include the support portions 58, only the body portion 51 of the bearing housing 50 and the center portion of the seal plate 40 are in contact with each other in the rotation axis direction. In this configuration, for example, when a force in the rotation axis direction acts on the radially outer portion of the seal plate 40 because of vibrations, or the like, of the internal combustion engine 10, the seal plate 40 can deform so as to deflect. When the seal plate 40 deforms in this way, there is a possibility that airtightness is not ensured between the end surface 40*a* of the seal plate 40 and the end surface of the compressor housing 30 on the other side in the rotation axis direction and, as a result, intake air leaks from between the end surface 40*a* of the seal plate 40 and the end surface of the compressor housing 30 on the other side in the rotation axis direction.

As shown in FIG. 5, in the present embodiment, the support portions 58 protrude outward in the radial direction of the coupling shaft 80 from the end portion of the outer periphery of the body portion 51 of the bearing housing 50 at one side in the rotation axis direction. The seal plate 40 is in contact with the support portions 58 of the bearing housing 50 from one side in the rotation axis direction. Therefore, even when the radially outer portion of the seal plate 40, located on the radially outer side relative to the body portion 51 of the bearing housing 50, attempts to deform from one side toward the other side in the rotation axis direction, a deformation of the seal plate 40 is restricted by the support portions 58 of the bearing housing 50. Thus, even when a force acts on the radially outer portion of the seal plate 40 from one side toward the other side in the rotation axis direction, a deformation of the seal plate 40 is suppressed.

The support portions 58 of the bearing housing 50 are fixed to the seal plate 40 by the bolts 192. Since the seal plate 40 is fixed to the support portions 58, even when the radially outer portion of the seal plate 40 attempts to deform from the other side toward one side in the rotation axis direction, deformation of the seal plate 40 is restricted by the support portions 58 of the bearing housing 50. Thus, at the radially outer portion of the seal plate 40, even when a force acts in the rotation axis direction, a deformation toward both sides in the rotation axis direction is suppressed.

As shown in FIG. 9, the three support portions 58 are disposed apart from each other in the circumferential direction of the coupling shaft 80. Therefore, in the present embodiment, as compared to the configuration that the support portion 58 extends all around in the circumferential direction of the coupling shaft 80, a deformation of the seal plate 40 is suppressed while an increase in weight due to the presence of the support portion 58 is minimized.

Since the support portions 58 are disposed apart from each other in the circumferential direction of the coupling shaft 80, the outside diameter of a portion with no support portion 58 reduces in the bearing housing 50. For example, it is assumed that, in forming the bearing housing 50 by molding, a cavity for a plurality of the bearing housings 50 is formed inside a single die. In this case, the number of the bearing housings 50 that can be molded inside a single die is easily increased by forming a cavity such that the support portions 58 of the respective bearing housings 50 are alternate inside the die.

The first support portion 58*a* is located on one side relative to the rotation axis 80*a* of the coupling shaft 80 in the direction along the imaginary straight line 58*d*. The second support portion 58*b* is located on the other side relative to the rotation axis 80*a* of the coupling shaft 80 in the direction along the imaginary straight line 58*d*. In other words, in the direction along the imaginary straight line 58*d*, the first support portion 58*a* and the second support portion 58*b* are located on opposite sides relative to the rotation axis 80*a* of the coupling shaft 80. For this reason, the radially outer portion of the seal plate 40 are in contact with the first support portion 58*a* and the second support portion 58*b* that are located on opposite sides relative to the rotation axis 80*a* of the coupling shaft 80. Therefore, in the circumferential direction of the coupling shaft 80, a deformation of the radially outer portion of the seal plate 40 in the rotation axis direction is suppressed. Similarly, in the direction along the imaginary straight line 58*d*, the first support portion 58*a* and the third support portion 58*c* are located on opposite sides relative to the rotation axis 80*a* of the coupling shaft 80. Thus, deformation in the rotation axis direction is suppressed also by the contact of the radially outer portion of the seal plate 40 with the first support portion 58*a* and the third support portion 58*c* that are located on opposite sides relative to the rotation axis 80*a* of the coupling shaft 80.

Advantageous effects related to a configuration around the heat shield plate 130 will be described. In the turbocharger 20, when exhaust gas is introduced into the turbine housing 60, the temperature of the turbine housing 60 increases. If the facing surface 68*a* of the clamp flange portion 68 of the turbine housing 60 is in contact with the facing surface 59*a* of the clamp flange portion 59 of the bearing housing 50, a portion of the cylindrical portion 60B of the turbine housing 60 at one side in the rotation axis direction decreases in temperature as a result of transfer of heat to the bearing housing 50. In contrast to this, a portion of the cylindrical portion 60B of the turbine housing 60 at the other side in the rotation axis direction is difficult to decrease in temperature because transfer of heat to the bearing housing 50 is difficult. In other words, the portion of the cylindrical portion 60B of the turbine housing 60 at one side in the rotation axis direction is relatively low in temperature, while the portion of the cylindrical portion 60B of the turbine housing 60 at the other side in the rotation axis direction is relatively high in temperature. When there occurs a temperature difference in the turbine housing 60 in this way, large internal stress is generated in the turbine housing 60 because of a difference in the amount of thermal expansion, and this internal stress may be a cause of a deformation or crack of the turbine housing 60.

In the present embodiment, as shown in FIG. 7, a gap is formed between the facing surface 59*a* of the clamp flange portion 59 of the bearing housing 50 and the facing surface 68*a* of the clamp flange portion 68 of the turbine housing 60 in all the regions facing in the rotation axis direction. In the portion where there is a gap in this way, transfer of heat from the clamp flange portion 68 of the turbine housing 60 to the clamp flange portion 59 of the bearing housing 50 is difficult to occur. Therefore, the portion of the cylindrical portion 60B of the turbine housing 60 at one side in the rotation axis direction is difficult to decrease in temperature. Thus, a low-temperature portion and a high-temperature portion are difficult to occur in the turbine housing 60. As a result, in the turbine housing 60, internal stress due to a difference in the amount of thermal expansion is less likely to be generated, so a deformation or crack is reduced.

The outer peripheral portion 133 of the heat shield plate 130 is sandwiched in the thickness direction of the outer peripheral portion 133 between the clamping surface 51d of the coupling portion 51a of the bearing housing 50 and the clamping surface 67d of the coupling hole 67 of the turbine housing 60. Since the outer peripheral portion 133 of the heat shield plate 130 has a plate shape, the outer peripheral portion 133 is difficult to deform in the thickness direction. Therefore, the positional relationship in the rotation axis direction between the bearing housing 50 and the turbine housing 60 can be set via the outer peripheral portion 133 of the heat shield plate 130. Thus, as described above, even when there is a gap between the facing surface 59a of the clamp flange portion 59 of the bearing housing 50 and the facing surface 68a of the clamp flange portion 68 of the turbine housing 60 and the facing surfaces 59a, 68a are not in contact with each other, a deviation in the positional relationship in the rotation axis direction between the bearing housing 50 and the turbine housing 60 is reduced.

The outer peripheral portion 133 of the heat shield plate 130 is sandwiched all around in the circumferential direction of the coupling shaft 80 between the clamping surface 51d of the coupling portion 51a of the bearing housing 50 and the clamping surface 67d of the coupling hole 67 of the turbine housing 60. Therefore, the outer peripheral portion 133 of the heat shield plate 130 is in close contact with both the clamping surface 51d of the coupling portion 51a of the bearing housing 50 and the clamping surface 67d of the coupling hole 67 of the turbine housing 60 all around in the circumferential direction of the coupling shaft 80. Thus, the outer peripheral portion 133 of the heat shield plate 130 also functions as a seal member that reduces leakage of exhaust gas inside the turbine housing 60 to the outside. Therefore, even when there is a gap between the facing surface 59a of the clamp flange portion 59 of the bearing housing 50 and the facing surface 68a of the clamp flange portion 68 of the turbine housing 60, exhaust gas does not leak to the outside via the gap therebetween. As a result, no seal member that reduces leakage of exhaust gas inside the turbine housing 60 to the outside needs to be additionally installed.

As described above, the outer peripheral portion 133 of the heat shield plate 130 is sandwiched between the clamping surface 51d of the coupling portion 51a of the bearing housing 50 and the clamping surface 67d of the coupling hole 67 of the turbine housing 60. For this reason, the outer peripheral portion 133 of the heat shield plate 130 does not move in the direction perpendicular to the rotation axis 80a of the coupling shaft 80. Therefore, neither the outer peripheral portion 133 of the heat shield plate 130 slides on the clamping surface 51d of the coupling portion 51a of the bearing housing 50 or the clamping surface 67d of the coupling hole 67 of the turbine housing 60 nor the outer peripheral portion 133 of the heat shield plate 130 wears.

Advantageous effects related to a configuration around the waste gate valve 150 will be described. It is assumed that the shaft 151 and valve element 152 of the waste gate valve 150 are separate members and the waste gate valve 150 is formed by assembling the shaft 151 and the valve element 152 to each other. With this configuration, when the waste gate valve 150 changes the bypass passage 64 from the open state to the fully closed state or when the pressure of exhaust gas flowing through the bypass passage 64 fluctuates while the waste gate valve 150 places the bypass passage 64 in the open state, chatter may occur at the portion at which the shaft 151 and the valve element 152 are assembled to each other. Such chatter may be perceived by an occupant of the vehicle as noise.

Figure 12B:
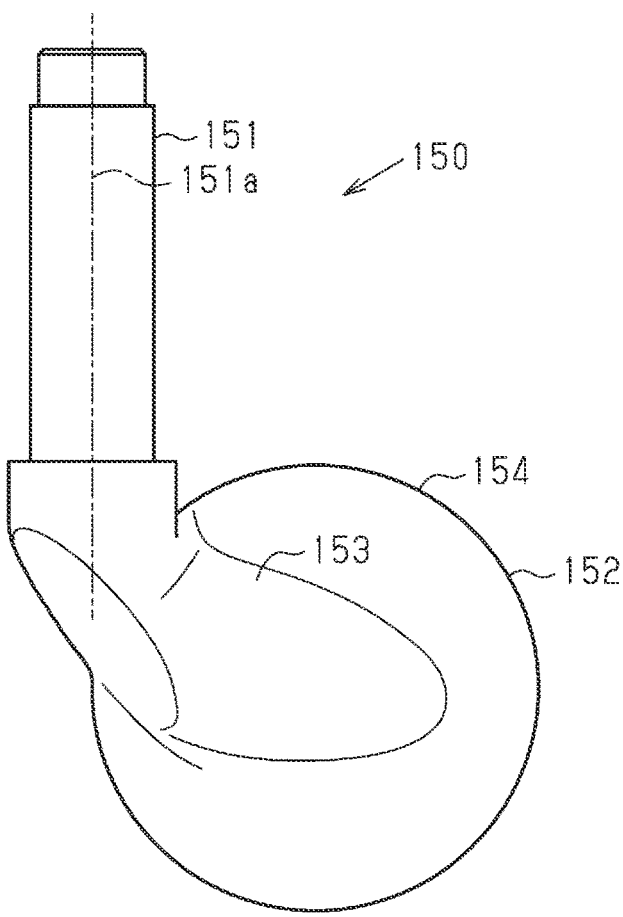
FIG. 12B is a front view of the waste gate valve.
Figure 12C:
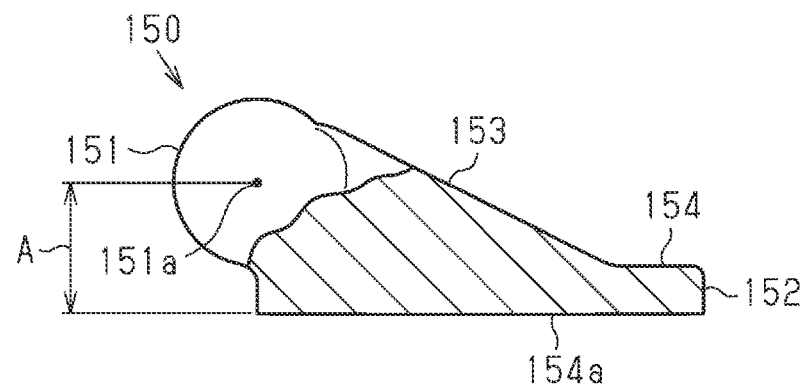
FIG. 12C is a bottom view of the waste gate valve.

In the present embodiment, as shown in FIG. 12B, the waste gate valve 150 is a one-piece molding in which the shaft 151 and the valve element 152 are integrated. Since the shaft 151 and the valve element 152 are integrated in this way, the valve element 152 does not rock relative to the shaft 151 or chatter does not occur as a result of rocking.

It is assumed that the distance A from the contact surface 154a of the valve element 152 to the rotation axis 151a of the shaft 151 in the direction perpendicular to the contact surface 154a as shown in FIG. 12C is designed so as to be equal to the distance B from the contact surface 65a of the valve seat 65 to the rotation axis 151a of the shaft 151 in the direction perpendicular to the contact surface 65a as shown in FIG. 13. When it is assumed that the waste gate valve 150 and the turbine housing 60 are manufactured as designed, the contact surface 65a of the valve seat 65 of the turbine housing 60 and the contact surface 154a of the valve element 152 of the waste gate valve 150 are in surface contact with each other in the fully closed state of the bypass passage 64.

Figure 15A:
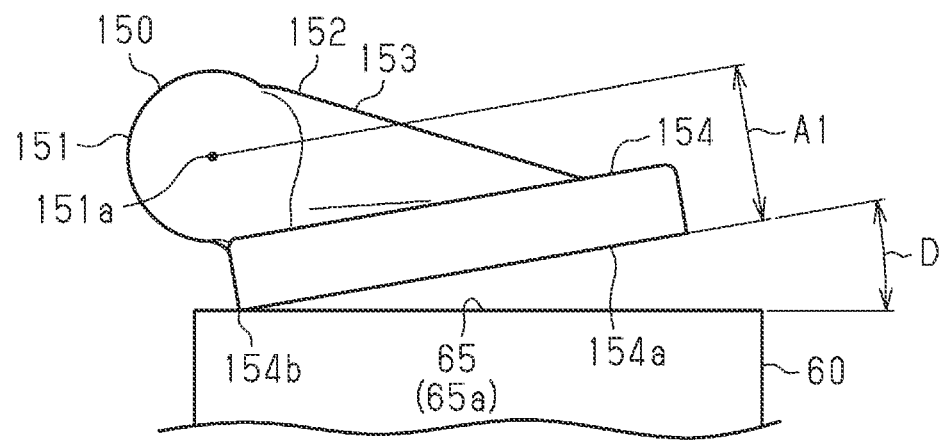
FIG. 15A is a view that illustrates a configuration around a waste gate valve according to a comparative example.

However, as described above, even when the contact surface 65a of the valve seat 65 of the turbine housing 60 and the contact surface 154a of the valve element 152 of the waste gate valve 150 are designed to be in surface contact with each other in the fully closed state of the bypass passage 64, a manufacturing error, or the like, actually occurs, so the contact surfaces 65a, 154a are not always be in surface contact with each other. Particularly, as shown in FIG. 15A, when an actual distance A1 is longer than the distance A that is a designed value, the waste gate valve 150 contacts the contact surface 65a of the valve seat 65 such that the proximal end of the valve element 152 contacts the contact surface 65a first when the bypass passage 64 is set to the fully closed state. Specifically, when the bypass passage 64 is set to the fully closed state, one end portion 154b, closer to the shaft 151, of the contact surface 154a interferes with the contact surface 65a of the valve seat 65 and the waste gate valve 150 cannot rotate any more before the waste gate valve 150 is fully closed.

Figure 15B:
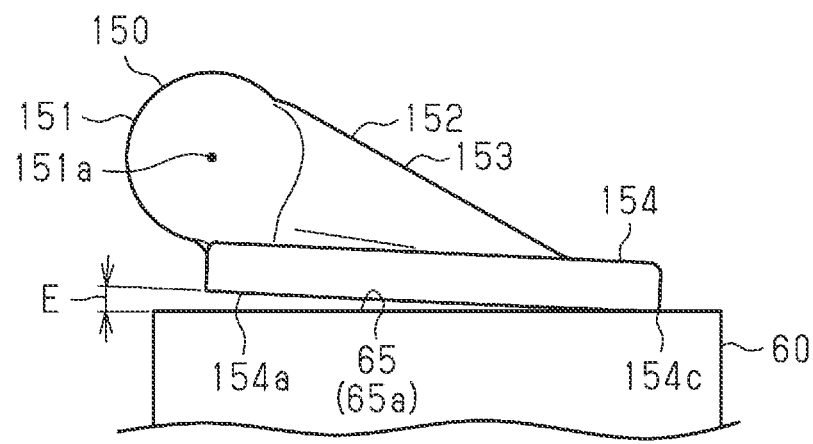
FIG. 15B is a view that illustrates a configuration around the waste gate valve.

In the present embodiment, the distance A is designed so as to be shorter than the distance B. For this reason, even when there is some manufacturing error, or the like, in the waste gate valve 150 or the turbine housing 60, the waste gate valve 150 contacts the contact surface 65a of the valve seat 65 such that the distal end portion of the valve element 152 contacts the contact surface 65a of the valve seat 65 first when the bypass passage 64 is set to the fully closed state as shown in FIG. 15B. Specifically, when the bypass passage 64 is set to the fully closed state, the other end portion 154c of the contact surface 154a of the valve element 152, farther from the shaft 151 (right side in FIG. 15B), contacts the contact surface 65a of the valve seat 65. Therefore, interference of the contact surface 154a of the valve element 152 with the contact surface 65a of the valve seat 65 does not occur before the waste gate valve 150 is fully closed. Thus, even when there occurs the same amount of manufacturing error, or the like, an angle E that the contact surface 154a of the valve element 152 makes with the contact surface 65a of the valve seat 65 is less than an angle D that the contact surface 154a of the valve element 152 makes with the contact surface 65a of the valve seat 65 in the fully closed state of the bypass passage 64 as shown in FIG. 15A and FIG. 15B. As a result, in the fully closed state of the bypass passage 64, a gap between the contact surface 154a of the valve element 152 and the contact surface 65a of the valve seat 65 is reduced, so the amount of exhaust gas that leaks from the bypass passage 64 to the discharge passage 63 is reduced. FIG. 15A and FIG. 15B exaggeratedly show the angle D and the angle E.

As shown in FIG. 13, when the bypass passage 64 is set to the fully closed state, the link rod 172 is actuated from the other side (upper side in FIG. 13) to one side (lower side in FIG. 13) in the longitudinal direction of the link rod 172 by the actuator 180. When the bypass passage 64 is maintained in the fully closed state, a force from the other side toward one side in the longitudinal direction of the link rod 172 via the link arm 171 acts on the end portion of the shaft 151 of the waste gate valve 150 on the outer side of the turbine housing 60. As a result, the shaft 151 of the waste gate valve 150 inclines such that the end portion on the outer side of the turbine housing 60 is located on one side in the longitudinal direction of the link rod 172 and the end portion on the inner side of the turbine housing 60 is located on the other side in the longitudinal direction of the link rod 172. The contact surface 154a of the valve element 152 of the waste gate valve 150 inclines such that the end portion on the outer side of the turbine housing 60 is located on one side in the longitudinal direction of the link rod 172 and the end portion on the inner side of the turbine housing 60 is located on the other side in the longitudinal direction of the link rod 172.

In the present embodiment, as shown in FIG. 12A, in anticipation of an inclination of the shaft 151 of the waste gate valve 150, which occurs in the fully closed state of the bypass passage 64 as described above, the contact surface 154a of the valve element 152 is inclined relative to the rotation axis 151a of the shaft 151. Specifically, the contact surface 154a of the valve element 152 is inclined such that a portion of the contact surface 154a shifts outward in the radial direction of the shaft 151 relative to the rotation axis 151a of the shaft 151 as the portion of the contact surface 154a comes away from the link arm 171 in the direction of the rotation axis 151a, which is the direction along the rotation axis 151a of the shaft 151. As shown in FIG. 13, in the fully closed state of the bypass passage 64, the contact surface 154a of the valve element 152 is parallel to the contact surface 65a of the valve seat 65. Thus, even when the shaft 151 is inclined in the fully closed state of the bypass passage 64, a gap that is formed between the contact surface 154a of the valve element 152 and the contact surface 65a of the valve seat 65 is reduced.

As shown in FIG. 15B, when the bypass passage 64 is set to the fully closed state, the waste gate valve 150 rotates around the rotation axis 151a of the shaft 151, and the other end portion 154c of the contact surface 154a of the valve element 152, farther from the shaft 151, contacts the contact surface 65a of the valve seat 65. When the other end portion 154c of the contact surface 154a of the valve element 152 is in contact with the contact surface 65a of the valve seat 65, stress that is generated when the valve element 152 is pressing the valve seat 65 increases as a portion of the valve element 152 approaches the shaft 151. The size of the connecting portion 153 in the direction perpendicular to the contact surface 154a of the valve main body 154 increases toward the shaft 151 (left side in FIG. 15B). Therefore, with the waste gate valve 150, the stiffness of the connecting portion 153 of the valve element 152 is improved. Thus, a deformation, crack, or the like, in the connecting portion 153 of the valve element 152 is reduced.

Advantageous effects related to a configuration around the bypass passage 64 will be described. As shown in FIG. 8, in the turbocharger 20, in the open state of the bypass passage 64, as exhaust gas flows through the bypass passage 64, the exhaust gas flows toward the catalyst 15 located downstream of the turbine housing 60. The catalyst 15 is warmed up by exhaust gas, so the catalyst 15 is activated to exercise exhaust emission control performance.

Incidentally, even when the flow rate or temperature of exhaust gas flowing toward the catalyst 15 remains unchanged, the warm-up rate of the catalyst 15 varies depending on an angle that the partition walls 17 of the catalyst 15 make with the direction of flow of exhaust gas. For example, if the angle C of acute angle that the central axis 64b of the outlet portion 64a of the bypass passage 64 makes with the central axis 16a of the cylindrical portion 16 of the catalyst 15 is large (for example, 80 degrees), exhaust gas flowing through the bypass passage 64 can collide with the upstream end of the catalyst 15 and stagnate at a portion upstream of the catalyst 15 in the exhaust pipe 13. If the central axis 64b of the outlet portion 64a of the bypass passage 64 is parallel to the central axis 16a of the cylindrical portion 16 of the catalyst 15, exhaust gas flowing through the bypass passage 64 can flow to the downstream side without colliding with the wall surfaces of the partition walls 17 of the catalyst 15. In other words, when the angle C of acute angle that the central axis 64b of the outlet portion 64a of the bypass passage 64 makes with the central axis 16a of the cylindrical portion 16 of the catalyst 15 is excessively large or excessively small, the warm-up rate of the catalyst 15 decreases, and the catalyst 15 is not quickly activated.

In the present embodiment, the central axis 64b of the outlet portion 64a of the bypass passage 64 intersects with the first partition walls 17a of the catalyst 15. The angle C of acute angle that the central axis 64b of the outlet portion 64a of the bypass passage 64 makes with the central axis 16a of the cylindrical portion 16 of the catalyst 15 is 30 degrees. Therefore, in the open state of the bypass passage 64, as exhaust gas flowing through the bypass passage 64 reaches the catalyst 15, the exhaust gas collides with the wall surfaces of the first partition walls 17a of the catalyst 15. Exhaust gas having collided with the wall surfaces of the first partition walls 17a flows downward along the wall surfaces of the first partition walls 17a. As a result, the heat of exhaust gas is transferred to the first partition walls 17a of the catalyst 15, and the temperature of the catalyst 15 can be quickly increased.

As shown in FIG. 8, the contact surface 154a of the valve element 152 of the waste gate valve 150, including the portion that contacts the valve seat 65, entirely has a flat surface. Therefore, in the present embodiment, as compared to the case where part of the contact surface 154a of the valve element 152 has a curved surface, the valve element 152 of the waste gate valve 150 does not interfere with flow of exhaust gas flowing through the bypass passage 64 in the open state of the bypass passage 64. Thus, exhaust gas flowing through the bypass passage 64 can be guided toward the catalyst 15 by the valve element 152 of the waste gate valve 150.

Advantageous effects related to a method of welding the turbine wheel 90 to the coupling shaft 80 will be described. In the above-described full-scale welding process, full-scale welding is performed on the contact portion between the end portion of the shaft portion 92 of the turbine wheel 90 at one side in the rotation axis direction and the end portion of the large-diameter portion 82 of the coupling shaft 80 at the other side in the rotation axis direction by rotating the contact portion 360 degrees around the rotation axis 80a of the coupling shaft 80. Therefore, in the present embodiment, as compared to a manufacturing method for welding the turbine wheel 90 to the coupling shaft 80 by rotating the turbine wheel 90 and the coupling shaft 80 360 degrees around the rotation axis 80a of the coupling shaft 80 multiple times, a welding time is reduced. Thus, an increase in manufacturing cost for the turbocharger 20 due to an extension of the welding time for the turbine wheel 90 and the coupling shaft 80 is suppressed.

The present embodiment may be modified as follows. The present embodiment and the following modifications may be implemented in combination with each other without any technical contradiction. In the above-described embodiment, the number of the guide vanes 37 may be changed. For example, when the number of the blades 71 of the compressor wheel 70 is changed, the number of the guide vanes 37 just needs to be a minimum odd number greater than the number of the blades 71.

For example, when vibrations that occur in the compressor wheel 70 are relatively small and do not matter in driving the turbocharger 20, the number of the guide vanes 37 may be changed regardless of the number of the blades 71.

In the above-described embodiment, the configuration of the compressor wheel 70 may be changed. For example, as described above, the number of the blades 71 may be changed. Similarly, the number of the auxiliary blades 72 may be changed or the auxiliary blades 72 may be omitted. The relationship between the number of the blades 71 and the number of the auxiliary blades 72 may be changed. Specifically, the number of the blades 71 may be greater than or less than the number of the auxiliary blades 72.

In the above-described embodiment, the configuration of the compressor housing 30 may be changed. For example, the length of extension of each guide vane 37 in the rotation axis direction may be changed. Specifically, the guide vanes 37 may be provided only at one side of the cylindrical member 36 in the rotation axis direction relative to the midpoint X. Alternatively, the guide vanes 37 may be provided only at the other side of the cylindrical member 36 in the rotation axis direction relative to the midpoint X.

In the above-described embodiment, the inlet duct 36A and housing body 39 of the compressor housing 30 may be integrated. In this case as well, the guide vanes 37 just need to protrude from the inner wall surface of the introduction passage 35 of the compressor housing 30.

In the above-described embodiment, the inlet duct 36A and the intake pipe 11 may be separate members. In the above-described embodiment, the configuration of the coupling shaft 80 may be changed. For example, when there is a low possibility that exhaust gas inside the turbine housing 60 flows into the bearing housing 50, the second seal member 107 may be omitted, so the second recess 82b of the coupling shaft 80 may be omitted accordingly.

In the above-described embodiment, the orientation of the second seal member 107 installed relative to the first seal member 106 may be changed. For example, when the amount of exhaust gas flowing from the inside of the turbine housing 60 into one side relative to the first seal member 106 in the rotation axis direction is relatively small, the cutout portion of the first seal member 106 and the cutout portion of the second seal member 107 may be present at the same position in the circumferential direction when viewed in the rotation axis direction. In other words, there may be a portion where any of the first seal member 106 and the second seal member 107 is not present at a portion in the circumferential direction of the coupling shaft 80 when viewed in the rotation axis direction.

In the above-described embodiment, the configurations of the first seal member 106 and second seal member 107 may be changed. For example, the first seal member 106 may have an endless annular shape. In this case, when viewed in the rotation axis direction, the orientation of the second seal member 107 installed relative to the first seal member 106 may be changed as needed. The range of extension of the first seal member 106 in the circumferential direction of the coupling shaft 80 may be less than 180 degrees. In this case, as long as the total of the range of extension of the first seal member 106 in the circumferential direction and the range of extension of the second seal member 107 in the circumferential direction exceeds 360 degrees, the first seal member 106 and the second seal member 107 may be disposed such that any one of the first seal member 106 and the second seal member 107 is interposed when viewed in the rotation axis direction.

In the above-described embodiment, the shape of the coolant passage 56 of the bearing housing 50 may be changed. For example, when the temperature of the first seal member 106, which increases under the influence of heat of exhaust gas flowing from the inside of the turbine housing 60, is relatively low, the end of the coolant passage 56 at the other side in the rotation axis direction may be located on one side relative to the second seal member 107 in the rotation axis direction.

In the above-described embodiment, the configuration of the float bearing 120 may be changed. For example, when the amount of oil flowing between the restricting portion 85 of the coupling shaft 80 and the end surface 125 of the float bearing 120 is large and there is a low possibility that the restricting portion 85 of the coupling shaft 80 contacts the end surface 125 of the float bearing 120, the tapered surfaces 125b of the end surface 125 of the float bearing 120 may be omitted.

In the above-described embodiment, the numbers of the land surfaces 125a and tapered surfaces 125b on the end surface 125 of the float bearing 120 may be changed. For example, the numbers of the land surfaces 125a and tapered surfaces 125b may be three or less or five or more.

In the above-described embodiment, the position of the groove 125c on each tapered surface 125b of the float bearing 120 may be changed. For example, the groove 125c may be located at a center portion of each tapered surface 125b in the circumferential direction or may be located at an end portion of the tapered surface 125b at the preceding side in the rotation direction of the coupling shaft 80.

In the above-described embodiment, the shape of the groove 125c on each tapered surface 125b of the float bearing 120 may be changed. For example, the end portion of the groove 125c at the outer side in the radial direction of the coupling shaft 80 may reach the outer peripheral edge 125e of the end surface 125. In addition, the depth of the groove 125c may be constant.

In the above-described embodiment, the groove 125c on each tapered surface 125b of the float bearing 120 may be omitted. For example, when the amount of oil that is supplied from between the outer periphery of the coupling shaft 80 and the inner periphery of the float bearing 120 to the tapered surfaces 125b of the float bearing 120 is sufficiently large, the grooves 125c may be omitted.

In the above-described embodiment, the configuration of the bearing housing 50 may be changed. For example, when the amount of oil flowing radially outward from between the restricting portion 85 of the coupling shaft 80 and the end surface 125 of the float bearing 120 is small, the second annular space 54e of the oil drain space 54 in the bearing housing 50 may be omitted. Similarly, the first annular space 54d of the oil drain space 54 in the bearing housing 50 may be omitted.

In the above-described embodiment, the fixing pin 129 for fixing the float bearing 120 may be omitted. For example, when the float bearing 120 is fixed to the bearing housing 50 by forming a recess at an end portion of the float bearing 120 at one side in the rotation axis direction and fitting a protruding member to the recess, the fixing pin 129 may be omitted. In such a case, when a configuration similar to the end surface 125 of the float bearing 120 on the other side in the rotation axis direction cannot be employed for the end surface 128 of the float bearing 120 on one side in the rotation axis direction, a thrust bearing, or the like, may be installed in the bearing housing 50 to support the end surface 128 of the float bearing 120.

In the above-described embodiment, the configuration of the bearing housing 50 may be changed. For example, when the amount of deformation at the radially outer portion of the seal plate 40, which occurs because of vibrations, or the like, of the internal combustion engine 10, is small, the support portions 58 of the bearing housing 50 may be omitted.

In the above-described embodiment, the fixing configuration of the support portions 58 of the bearing housing 50 to the seal plate 40 may be changed. For example, the support portions 58 of the bearing housing 50 may be fixed to the radially outer portion of the seal plate 40 by welding.

The support portions 58 of the bearing housing 50 need not be fixed to the seal plate 40. For example, as long as the body portion 51 of the bearing housing 50 is fixed to the center portion of the seal plate 40, the support portions 58 of the bearing housing 50 need not be fixed to the seal plate 40.

In the above-described embodiment, the shape or number of the support portions 58 of the bearing housing 50 may be changed. For example, the number of the support portions 58 of the bearing housing 50 may be two or less or four or more. The bearing housing 50 may include a single support portion 58 that extends all around in the circumferential direction of the coupling shaft 80.

In the above-described embodiment, the positional relationship among the support portions 58 of the bearing housing 50 may be changed. For example, all the first support portion 58a, the second support portion 58b, and the third support portion 58c may be located on one side relative to the rotation axis 80a of the coupling shaft 80 in the direction along the imaginary straight line 58d. When there is a portion where a deflection in the rotation axis direction easily occurs at the radially outer portion of the seal plate 40, the support portion 58 just needs to be disposed near that portion.

In the above-described embodiment, the connection configuration of the bearing housing 50 and the turbine housing 60 may be changed. For example, when a deviation hardly occurs in the temperature distribution of the turbine housing 60, the facing surface 59a of the clamp flange portion 59 of the bearing housing 50 may be in contact with the facing surface 68a of the clamp flange portion 68 of the turbine housing 60. When there is still a noncontact portion partially in the circumferential direction even when the facing surface 69a of the clamp flange portion 59 of the bearing housing 50 contacts the facing surface 68a of the clamp flange portion 68 of the turbine housing 60, some temperature difference in the turbine housing 60 is reduced.

In the above-described embodiment, the fixing configuration of the heat shield plate 130 between the bearing housing 50 and the turbine housing 60 may be changed. For example, the outer peripheral portion 133 of the heat shield plate 130 may be sandwiched between the bearing housing 50 and the turbine housing 60 partially in the circumferential direction of the coupling shaft 80. In this case, for example, when an additional seal member is installed between the bearing housing 50 and the turbine housing 60, leakage of exhaust gas inside the turbine housing 60 to the outside is reduced.

For example, when a deviation in the positional relationship in the rotation axis direction between the bearing housing 50 and the turbine housing 60 is relatively small, the outer peripheral portion 133 of the heat shield plate 130 need not be sandwiched between the bearing housing 50 and the turbine housing 60 in the thickness direction of the outer peripheral portion 133.

In the above-described embodiment, the fixing configuration of the clamp flange portion 68 of the turbine housing 60 and the clamp flange portion 59 of the bearing housing 50 may be changed. For example, the clamp flange portion 68 of the turbine housing 60 and the clamp flange portion 59 of the bearing housing 50 may be fixed by bolts and nuts.

In the above-described embodiment, the shape of each of the clamp flange portion 68 of the turbine housing 60 and the clamp flange portion 59 of the bearing housing 50 may be changed. For example, a recess may be recessed in the rotation axis direction from the facing surface 68a of the clamp flange portion 68 of the turbine housing 60. A recess may be recessed in the rotation axis direction from the facing surface 59a of the clamp flange portion 59 of the bearing housing 50. Then, a positioning pin may be fitted between the recess of the turbine housing 60 and the recess of the bearing housing 50. In this case as well, when a gap is provided between the facing surface 68a of the clamp flange portion 68 of the turbine housing 60 and the facing surface 59a of the clamp flange portion 59 of the bearing housing 50, transfer of heat from the clamp flange portion 68 of the turbine housing 60 toward the clamp flange portion 59 of the bearing housing 50 is difficult.

In the above-described embodiment, the relationship between the distance A from the contact surface 154a to the rotation axis 151a of the shaft 151 in the direction perpendicular to the contact surface 154a of the valve element 152 and the distance B from the contact surface 65a to the rotation axis 151a of the shaft in the direction perpendicular to the contact surface 65a of the valve seat 65 may be changed. For example, when the manufacturing accuracy of the waste gate valve 150 is high and a manufacturing error is ignorably small, such a design that the distance A and the distance B are equal to each other does not matter.

In the above-described embodiment, the inclination of the contact surface 154a of the valve element 152 relative to the rotation axis 151a of the shaft 151 may be changed. For example, depending on the configuration of the through-hole 69 of the turbine housing 60, the bush 160, and the shaft 151 of the waste gate valve 150, the amount of inclination of the shaft 151 of the waste gate valve 150 relative to the through-hole 69 of the turbine housing 60 varies in the fully closed state of the bypass passage 64. Therefore, the inclination of the contact surface 154a of the valve element 152 relative to the rotation axis 151a of the shaft 151 just needs to be changed according to the amount of inclination of the shaft 151 of the waste gate valve 150 relative to the through-hole 69 of the turbine housing 60 in the fully closed state of the bypass passage 64. When the amount of inclination of the shaft 151 of the waste gate valve 150 relative to the through-hole 69 of the turbine housing 60 is relatively small, the contact surface 154a of the valve element 152 need not be inclined relative to the rotation axis 151a of the shaft 151.

For example, depending on the coupling configuration of the link mechanism 170, when the bypass passage 64 is set to the fully closed state, the link rod 172 is actuated from one side (lower side in FIG. 13) to the other side (upper side in FIG. 13) in the longitudinal direction of the link rod 172. As a result, in the fully closed state of the bypass passage 64, the shaft 151 of the waste gate valve 150 is inclined such that the end portion on the outer side of the turbine housing 60 is located on the other side in the longitudinal direction of the link rod 172 and the end portion on the inner side of the turbine housing 60 is located on one side in the longitudinal direction of the link rod 172. In this case, the contact surface 154a of the valve element 152 just needs to be inclined such that a portion of the contact surface 154a shifts inward (right side in FIG. 12A) in the radial direction of the shaft 151 relative to the rotation axis 151a of the shaft 151 as the portion of the contact surface 154a comes away from the link arm 171 in the direction of the rotation axis 151a (lower side in FIG. 12A), which is the direction along the rotation axis 151a of the shaft 151.

In the above-described embodiment, the configuration of the valve element 152 of the waste gate valve 150 may be changed. For example, when the contact surface 154a of the valve element 152 of the waste gate valve 150 and the contact surface 65a of the valve seat 65 are in surface contact with each other, stress that is generated in the valve element 152 when the contact surface 154a of the valve element 152 is in contact with the contact surface 65a of the valve seat 65 tends to reduce. In such a case, the size of the connecting portion 153 in the direction perpendicular to the contact surface 154a of the valve main body 154 may be constant.

In the above-described embodiment, the angle C of acute angle that the central axis 64b of the outlet portion 64a of the bypass passage 64 makes with the central axis 16a of the cylindrical portion 16 of the catalyst 15 may be changed. For example, the angle C of acute angle that the central axis 64b of the outlet portion 64a of the bypass passage 64 makes with the central axis 16a of the cylindrical portion 16 of the catalyst 15 may be changed within the range of 25 degrees to 35 degrees. The inventor found by experiments, and the like, that, when the angle C fell within the range of 25 degrees to 35 degrees, the temperature of the catalyst 15 was quickly increased by the collision of exhaust gas with the partition walls 17 of the catalyst 15.

For example, when the catalyst 15 is sufficiently warmed up by exhaust gas flowing through the accommodation space 62 of the turbine housing 60, the angle C of acute angle that the central axis 64b of the outlet portion 64a of the bypass passage 64 makes with the central axis 16a of the cylindrical portion 16 of the catalyst 15 may be less than 25 degrees or may be greater than 35 degrees.

In the above-described embodiment, the configuration of the catalyst 15 may be changed. For example, when viewed in the direction along the central axis 16a of the cylindrical portion 16, the partition walls 17 of the catalyst 15 may have a honeycomb shape. In this case as well, when the angle C of acute angle that the central axis 64b of the outlet portion 64a of the bypass passage 64 makes with the central axis 16a of the cylindrical portion 16 of the catalyst 15 falls within the range of 25 degrees to 35 degrees, exhaust gas can be caused to flow along the wall surfaces of the partition walls 17.

In the above-described embodiment, the manufacturing method for welding the turbine wheel 90 to the coupling shaft 80 may be changed. For example, when a time required to fixedly weld the turbine wheel 90 to the coupling shaft 80 is relatively short and the manufacturing cost for the turbocharger 20 is difficult to increase, the turbine wheel 90 and the coupling shaft 80 may be welded by being rotated 360 degrees around the rotation axis 80a of the coupling shaft 80 multiple times.

A turbine wheel is accommodated in a turbine housing of a turbocharger described in Japanese Unexamined Patent Application Publication No. 2018-040317 (JP 2018-040317 A). One end of a coupling shaft is fixed to the turbine wheel. The coupling shaft is rotatably supported inside a bearing housing. A flange portion is provided at an end portion of the turbine housing. Another flange portion is provided at an end portion of the bearing housing. The flange portion of the turbine housing and the flange portion of the bearing housing are fixed by a clamp member in a state where the flange portions face each other.

In the turbocharger of JP 2018-040317 A, exhaust gas is introduced into the turbine housing, so the temperature of the turbine housing increases. At this time, at a portion of the turbine housing, which is in contact with the bearing housing, heat is transferred to the bearing housing, so the temperature of the portion decreases. On the other hand, at a portion of the turbine housing, farther from the bearing housing, transfer of heat to the bearing housing is difficult, so the temperature of the portion is difficult to decrease. In other words, in the turbine housing, there are a low-temperature portion and a high-temperature portion. In this way, when there is a temperature difference in the turbine housing, large internal stress is generated in the turbine housing because of a difference in the amount of thermal expansion and causes a deformation or crack, so it is undesirable.

In light of such inconvenience, regardless of whether a waste gate valve is formed as one piece, a configuration that a gap is provided between a facing surface of the flange portion of the turbine housing and a facing surface of the flange portion of the bearing housing just needs to be employed.

A compressor housing of a turbocharger is installed in an intake pipe of an internal combustion engine described in WO 2015/001644. An accommodation space for accommodating a compressor wheel is defined inside the compressor housing. In addition, an introduction passage for introducing intake air into the accommodation space is defined in the compressor housing. Plate guide vanes that rectify intake air protrude from an inner wall surface of the introduction passage. A plurality of the guide vanes is disposed apart from each other in a circumferential direction of the introduction passage. The compressor wheel is accommodated in the accommodation space of the compressor housing. The compressor wheel includes a shaft portion extending in a rotation axis direction of the compressor wheel and a plurality of blades protruding radially outward from the shaft portion.

In the turbocharger described in WO 2015/001644, when the compressor wheel rotates and intake air flows from the introduction passage to the accommodation space, intake air strikes the compressor wheel. Therefore, the compressor wheel slightly vibrates on impact caused by the collision of intake air. Depending on the relationship between the number of blades of the compressor wheel and the number of guide vanes in the compressor housing, vibrations that occur in the compressor wheel can unignorably increase.

In light of such inconvenience, regardless of whether a waste gate valve is formed as one piece, a configuration that the number of the guide vanes of the compressor housing is set to a minimum odd number greater than the number of the blades of the compressor wheel just needs to be employed.

A turbocharger described in Japanese Unexamined Patent Application Publication No. 2015-127517 (JP 2015-127517 A) includes a substantially cylindrical bearing housing. A coupling shaft that couples a turbine wheel and a compressor wheel is rotatably supported inside the bearing housing. A substantially disc-shaped seal plate is fixed to one side (compressor wheel side) of the bearing housing in a rotation axis direction of the coupling shaft. Specifically, the outside diameter of the seal plate is greater than the outside diameter of the bearing housing. A center portion of the seal plate is fixed to the bearing housing by screws. A compressor housing is fixed to an opposite side of the seal plate from the bearing housing. A space in which the compressor wheel is accommodated and a scroll passage through which intake air to be fed under pressure by the compressor wheel flows are defined by the seal plate and the compressor housing.

In the turbocharger described in JP 2015-127517 A, the seal plate projects radially outward from an outer periphery of the bearing housing. Therefore, when a force in an axial direction of the bearing housing acts on a radially outer portion of the seal plate, the seal plate may deform so as to deflect. If the seal plate deforms, airtightness between the seal plate and the compressor housing cannot be ensured, and intake air may leak from between the seal plate and the compressor housing.

In light of such inconvenience, regardless of whether a waste gate valve is formed as one piece, a configuration that the seal plate contacts a support portion of the bearing housing from one side in the rotation axis direction just needs to be employed.

A cylindrical float bearing is inserted inside a bearing housing in a turbocharger described in Japanese Unexamined Patent Application Publication (Translation of PCT Application) No. 2004-512453 (JP 2004-512453 A). A coupling shaft that couples a turbine wheel and a compressor wheel is inserted in the float bearing. An end portion of the coupling shaft in a rotation axis direction protrudes toward the outside of the float bearing.

A restricting portion having a greater outside diameter than the other portions can be provided at the end portion of the coupling shaft as described in JP 2004-512453 A. The restricting portion of the coupling shaft contacts an end portion of the float bearing in the axial direction. Thus, movement of the coupling shaft in the rotation axis direction relative to the float bearing is restricted. For this reason, wear easily occurs at the end portion of the float bearing in the axial direction or the restricting portion of the coupling shaft. Therefore, in the turbocharger, a structure that reduces such wear is sought.

In light of such inconvenience, regardless of whether a waste gate valve is formed as one piece, a configuration that land surfaces and tapered surfaces are provided on an end surface of the float bearing that faces the restricting portion of the coupling shaft just needs to be employed.

Japanese Unexamined Patent Application Publication No. 2009-068380 (JP 2009-068380 A) describes a technique for fixedly welding an end portion of a turbine wheel to an end portion of a coupling shaft in a turbocharger. Specifically, with the technique described in JP 2009-068380 A, the end portion of the turbine wheel and the end portion of the coupling shaft are brought into contact with each other, and, in a state where electron beam is irradiated by an electron gun from an outer side in a radial direction of the coupling shaft to the contact portion between the end portions, the turbine wheel and the coupling shaft are rotated around a rotation axis of the coupling shaft relative to the electron gun. As a result, the end portions of the coupling shaft and turbine wheel are welded by the heat of the electron beam. After that, in a state where electron beam is irradiated by the electron gun from the outer side in the radial direction of the coupling shaft to an outer surface of the welded portion of the turbine wheel and coupling shaft, the turbine wheel and the coupling shaft are rotated around the rotation axis of the coupling shaft relative to the electron gun. As a result, the welded portion of the turbine wheel and coupling shaft is finished to a smooth surface.

In the manufacturing method described in JP 2009-068380 A, electron beam welding is performed twice, so a welding time for fixing the end portion of the coupling shaft to the end portion of the turbine wheel extends. A welding time extended in this way causes an increase in the manufacturing cost of the turbocharger.

In light of such inconvenience, regardless of whether a waste gate valve is formed as one piece, a manufacturing method for welding an end portion of a turbine wheel to an end portion of a coupling shaft by rotating the turbine wheel and the coupling shaft 360 degrees around a rotation axis of the coupling shaft once relative to an electron gun just needs to be employed.

A turbine wheel is accommodated in a turbine housing in a turbocharger described in Japanese Unexamined Patent Application Publication No. 2017-078435 (JP 2017-078435 A). One end of a coupling shaft is fixed to the turbine wheel. The coupling shaft is accommodated in a support hole defined in a bearing housing. A substantially annular seal member is mounted on an outer periphery of a turbine wheel-side end portion of the coupling shaft. With the seal member, a gap between the outer periphery of the turbine wheel-side end portion of the coupling shaft and an inner periphery of the support hole of the bearing housing is filled.

In the turbocharger described in JP 2017-078435 A, when an internal combustion engine is being driven, the pressure of exhaust gas flowing through the turbine housing can excessively increase. When the pressure of exhaust gas increases in this way, exhaust gas flowing through the turbine housing may flow into the bearing housing although the gap is filled with the seal member.

In light of such inconvenience, regardless of whether a waste gate valve is formed as one piece, a configuration that a second seal member is interposed between the outer periphery of the end portion of the coupling shaft at the other side in the rotation axis direction and the inner periphery of the support hole of the bearing housing on one side relative to the first seal member in the rotation axis direction just needs to be employed.

A catalyst for controlling exhaust gas is installed in an exhaust pipe of an internal combustion engine described in Japanese Unexamined Patent Application Publication No. 2018-087556 (JP 2018-087556 A). A turbine housing of a turbocharger is mounted at a portion upstream of the catalyst in the exhaust pipe. A turbine wheel that is rotated by the flow of exhaust gas is accommodated in the turbine housing. A bypass passage that bypasses the turbine wheel between a portion upstream of the turbine wheel and a portion downstream of the turbine wheel in a direction of flow of exhaust gas is provided in the turbine housing. An outlet portion of the bypass passage extends toward the catalyst located downstream of the turbine housing.

In the turbocharger described in JP 2018-087556 A, when the internal combustion engine is being driven, as exhaust gas flows through the bypass passage, the exhaust gas flows toward the catalyst located downstream of the turbine housing. Then, the catalyst is warmed up by the exhaust gas, with the result that the catalyst is activated and exercises exhaust emission control performance. Even when the flow rate or temperature of exhaust gas flowing toward the catalyst remains unchanged, the warm-up rate of the catalyst varies depending on an angle that partition walls of the catalyst make with the direction of flow of exhaust gas. As for the turbocharger described in JP 2018-087556 A, from the viewpoint of the warm-up rate of the catalyst, the direction of flow of exhaust gas from the bypass passage is not considered, and there is room for further improvement.

In light of such inconvenience, regardless of whether a waste gate valve is formed as one piece, a configuration that, when viewed in a direction perpendicular to a central axis of the outlet portion of the bypass passage and a central axis of a cylindrical portion of the catalyst, an angle of acute angle that the central axis of the outlet portion of the bypass passage makes with the central axis of the cylindrical portion of the catalyst falls within the range of 25 degrees to 35 degrees just needs to be employed.

Technical ideas and their advantageous effects that can be understood from the above-described embodiment and modifications will be described. A turbocharger includes a turbine housing and a bearing housing. The turbine housing accommodates a turbine wheel. The bearing housing supports a coupling shaft such that the coupling shaft is rotatable. The coupling shaft is coupled to the turbine wheel. A flange portion projects outward in a radial direction of the coupling shaft at an end portion of the turbine housing at one side in a rotation axis direction of the coupling shaft. A flange portion projects outward in the radial direction of the coupling shaft at an end portion of the bearing housing at the other side in the rotation axis direction of the coupling shaft. The flange portion of the turbine housing and the flange portion of the bearing housing are fastened by a fixing member in the rotation axis direction of the coupling shaft and fixed to each other. An annular heat shield plate is disposed between the turbine housing and the bearing housing. The heat shield plate is sandwiched by the turbine housing and the bearing housing. The flange portion of the turbine housing has a facing surface that faces the flange portion of the bearing housing in the rotation axis direction of the coupling shaft. The flange portion of the bearing housing has a facing surface that faces the flange portion of the turbine housing in the rotation axis direction of the coupling shaft. A gap is provided in all a region in the facing surface of the turbine housing, facing the facing surface of the bearing housing.

With the above configuration, at the portion where the gap is provided, transfer of heat from the flange portion of the turbine housing to the flange portion of the bearing housing is difficult. Therefore, the temperature of a portion of the turbine housing, closer to the bearing housing, is difficult to decrease. Thus, a low-temperature portion and a high-temperature portion are difficult to occur in the turbine housing.

In the above-described configuration, an outer peripheral portion that is a radially outer portion of the heat shield plate has a flat plate shape, and the outer peripheral portion of the heat shield plate is sandwiched by the turbine housing and the bearing housing in a thickness direction of the outer peripheral portion of the heat shield plate.

With this configuration, the outer peripheral portion of the heat shield plate has a flat plate shape and is difficult to deform in the thickness direction, so, when the outer peripheral portion of the heat shield plate is sandwiched, the positional relationship between the turbine housing and the bearing housing can be set. Therefore, even when there is a gap between the flange portion of the turbine housing and the flange portion of the bearing housing and both flange portions are not in direct contact with each other, a deviation in the positional relationship between the turbine housing and the bearing housing is reduced.

In the above configuration, the outer peripheral portion that is the radially outer portion of the heat shield plate is sandwiched by the turbine housing and the bearing housing all around in a circumferential direction of the coupling shaft.

With this configuration, the outer peripheral portion of the heat shield plate is in close contact with the turbine housing and the bearing housing all around in the circumferential direction of the coupling shaft. For this reason, the heat shield plate also functions as a seal member that prevents exhaust gas introduced into the turbine housing from leaking to the outside. Therefore, no additional member for preventing leakage of exhaust gas needs to be installed.

A turbocharger includes a compressor housing connected to an intake pipe and a compressor wheel accommodated in the compressor housing. The compressor wheel includes a shaft portion extending in a rotation axis direction of the compressor wheel and a plurality of blades protruding radially outward from the shaft portion. The blades are disposed apart from each other in a circumferential direction of the compressor wheel. An accommodation space for accommodating the compressor wheel and an introduction passage connected to the accommodation space from one side in the rotation axis direction and configured to introduce intake air into the accommodation space are defined in the compressor housing. A plurality of plate guide vanes protrudes from an inner wall surface of the introduction passage. The guide vanes are disposed apart from each other in a circumferential direction of the introduction passage. The number of the guide vanes is a minimum odd number greater than the number of the blades.

With the above configuration, intake air does not flow at portions where the guide vanes are provided, and intake air flows at portions where no guide vanes are provided, so intake air streams commensurate with the number of the guide vanes are generated. When these intake air streams collide with end portions of the blades of the compressor wheel, vibrations are generated in the compressor wheel. If the number of intake air streams (the number of the guide vanes) is equal to the number of the blades of the compressor wheel, the intake air streams collide with the blades at substantially the same timing and vibrations do not cancel one another, so vibrations can increase in the compressor wheel as a whole. In this regard, in the above configuration, the number of the guide vanes is neither equal to the number of the blades of the compressor wheel nor a multiple of the number of the blades. Therefore, rectified intake air streams do not collide with the end portions of the blades to generate vibrations at the same timing, so the vibrations interfere with one another and easily attenuate. In addition, with the above configuration, as compared to the configuration that the number of the guide vanes is less than the number of the blades, the number of intake air streams commensurate with the number of the guide vanes increases, so vibrations that are generated in the blades by a single intake air stream are reduced. Since the number of the guide vanes is a minimum value of odd numbers greater than the number of the blades, an increase in intake air resistance due to the guide vanes is minimized.

In the above configuration, the compressor wheel includes auxiliary blades protruding radially outward from the shaft portion. The auxiliary blades each are disposed between the blades arranged in the circumferential direction of the compressor wheel. An end of each blade at one side in the rotation axis direction is located on one side in the rotation axis direction relative to an end of each auxiliary blade at one side in the rotation axis direction.

With the above configuration, since an upstream end of each blade is located upstream of an upstream end of each auxiliary blade, a major part of air streams flowing to a downward side of the guide vanes collides with the upstream ends of the blades. With this configuration, since the number of the guide vanes is set according to the number of the blades located on the upstream side, vibrations of the compressor wheel are effectively suppressed.

In the above configuration, a central axis of the introduction passage coincides with the rotation axis, one side of the introduction passage in the rotation axis direction is open to an outside of the compressor housing, where, in the rotation axis direction, a point to which a distance from an end of the introduction passage at one side in the rotation axis direction and a distance from an end of each blade at one side in the rotation axis direction are equal is a midpoint, the guide vanes extend from the end of the introduction passage at one side in the rotation axis direction to the blade side relative to the midpoint in the rotation axis direction of the compressor wheel.

With the above configuration, since the guide vanes extend beyond half of the introduction passage extending from the opening of the introduction passage to the blades of the compressor wheel, the intake air rectification effect of the guide vanes is large. In addition, since the distance between the end portions of the guide vanes and the blades of the compressor wheel is relatively short, rectified intake air tends to reach the blades without being diffused.

In the above configuration, the compressor housing includes a housing body and a cylindrical member. The accommodation space is defined in the housing body. An insertion hole is defined in the housing body. The insertion hole extends from the accommodation space to one side in the rotation axis direction and opens to an outside of the compressor housing. The cylindrical member is inserted in the insertion hole. The insertion hole has a small-diameter portion and a large-diameter portion. The large-diameter portion is greater in inside diameter than the small-diameter portion. The large-diameter portion is located on one side relative to the small-diameter portion in the rotation axis direction. The large-diameter portion extends from the small-diameter portion to an end portion of the insertion hole at one side in the rotation axis direction. The cylindrical member is fitted to the large-diameter portion. An inside of the cylindrical member is the introduction passage. The cylindrical member and the guide vanes are integrated as a one-piece molding.

With this configuration, the guide vanes are provided in the compressor housing with simple work that the cylindrical member is fitted to the opening of the insertion hole of the housing body. Since no guide vanes are provided in the housing body, complication of the shape of the housing body resulting from provision of the guide vanes is avoided.

A turbocharger includes a bearing housing, a seal plate, and a compressor housing. A coupling shaft that couples a turbine wheel and a compressor wheel is inserted in the bearing housing. The seal plate is fixed to one side of the bearing housing in a rotation axis direction of the coupling shaft. The compressor housing is fixed to one side of the seal plate in the rotation axis direction of the coupling shaft, and defines an accommodation space for the compressor wheel with the seal plate. The bearing housing includes a body portion and a support portion. The body portion supports the coupling shaft such that the coupling shaft is rotatable. The support portion protrudes outward in a radial direction of the coupling shaft from an outer periphery of the body portion. The seal plate is in contact with the support portion from one side in the rotation axis direction of the coupling shaft.

With the above configuration, even when a radially outer portion of the seal plate, located on a radially outer side relative to a body portion of the bearing housing, attempts to deform from one side toward the other side in the rotation axis direction of the coupling shaft, a deformation is restricted by the support portion of the bearing housing. Therefore, even when a force acts on the radially outer portion of the seal plate from one side toward the other side in the rotation axis direction of the coupling shaft, a deformation of the seal plate is reduced.

In the above configuration, the seal plate is fixed to the support portion. With this configuration, since the seal plate is fixed to the support portion, even when the radially outer portion of the seal plate attempts to deform from the other side toward one side in the rotation axis direction of the coupling shaft, a deformation is restricted by the support portion of the bearing housing. Therefore, even when a force acts on the radially outer portion of the seal plate in the rotation axis direction of the coupling shaft, a deformation toward both sides in the rotation axis direction of the coupling shaft is reduced.

In the above configuration, a plurality of the support portions is disposed apart from each other in a circumferential direction of the coupling shaft. With this configuration, while a deformation of the seal plate is reduced, an increase in the weight, or the like, of the bearing housing resulting from provision of the support portions is minimized as compared to the configuration that the support portion extends all around in the circumferential direction.

In the above configuration, when one of the plurality of support portions disposed in the circumferential direction of the coupling shaft is a first support portion, one of the plurality of support portions, other than the first support portion, disposed in the circumferential direction of the coupling shaft is a second support portion, and a straight line perpendicular to a rotation axis of the coupling shaft and passing through the first support portion is an imaginary straight line, the first support portion is located on one side relative to the rotation axis of the coupling shaft in a direction of the imaginary straight line, and the second support portion is located on the other side relative to the rotation axis of the coupling shaft in the direction of the imaginary straight line.

With the above configuration, the radially outer portion of the seal plate contacts the first support portion and the second support portion that are located on opposite sides relative to the coupling shaft. Therefore, in the circumferential direction of the coupling shaft, a deformation of the radially outer portion of the seal plate is reduced.

In a turbocharger, a turbine housing that accommodates a turbine wheel and a compressor housing that accommodates a compressor wheel are coupled to each other via a bearing housing, a cylindrical float bearing is inserted in the bearing housing, a coupling shaft that couples the turbine wheel to the compressor wheel is inserted in the float bearing, and oil is supplied to between an inner periphery of the float bearing and an outer periphery of the coupling shaft. The coupling shaft includes a rod-shaped shaft body and a restricting portion. The shaft body is inserted in the float bearing. The restricting portion protrudes radially outward from an outer periphery of the shaft body and extends all around in a circumferential direction of the shaft body. Part of the shaft body protrudes toward an outer side of the float bearing relative to an end surface of the float bearing in an axial direction. The restricting portion protrudes from an outer periphery of the part of the shaft body. A land surface and a tapered surface are provided on the end surface of the float bearing. The land surface faces the restricting portion. The tapered surface is next to the land surface in a circumferential direction of the coupling shaft and is inclined relative to the land surface. The tapered surface is recessed relative to the land surface. The tapered surface is inclined so as to approach the restricting portion in the rotation axis direction of the coupling shaft toward a preceding side in a rotation direction of the coupling shaft while the turbocharger is being driven.

In the above configuration, oil present between the end surface of the float bearing and the restricting portion of the coupling shaft is dragged by the rotation of the restricting portion of the coupling shaft, and flows toward the preceding side in the rotation direction of the coupling shaft. With this configuration, the tapered surface of the float bearing is inclined so as to approach the restricting portion toward the preceding side in the rotation direction of the coupling shaft. In other words, the clearance between the tapered surface and the restricting portion reduces toward the preceding side in the rotation direction of the coupling shaft. Oil attempts to flow into the portion where the clearance is small, so the pressure of oil at this portion increases. In this way, when the pressure of oil between the tapered surface and the restricting portion is increased, a gap can be ensured between the end surface of the float bearing and the restricting portion of the coupling shaft, with the result that wearing of the end surface and the restricting portion resulting from the contact therebetween is reduced.

In the above configuration, a plurality of the land surfaces and a plurality of the tapered surfaces are provided on the end surface of the float bearing. The land surfaces are disposed apart from each other in the circumferential direction of the coupling shaft. The tapered surfaces each are located between the land surfaces disposed apart from each other in the circumferential direction of the coupling shaft.

With this configuration, the pressure of oil between each tapered surface and the restricting portion increases as a result of flow of oil between the end surface of the float bearing and the restricting portion of the coupling shaft. Thus, portions where the pressure of oil is high can be distributed in the circumferential direction of the coupling shaft, so an inclination of the coupling shaft with respect to the float bearing by the pressure of oil that acts on the restricting portion of the coupling shaft is reduced.

In the above configuration, a groove recessed from the tapered surface is provided on the end surface of the float bearing, and the groove extends outward in a radial direction of the coupling shaft from an inner peripheral edge of the end surface of the float bearing.

With this configuration, oil between the inner periphery of the float bearing and the outer periphery of the shaft body of the coupling shaft can be supplied to the tapered surface via the groove. Thus, sufficient oil is supplied to between the tapered surface and the restricting portion.

In the above configuration, the groove does not reach an outer peripheral edge of the float bearing. With this configuration, oil flowing from the inner peripheral edge of the float bearing to the groove is difficult to flow out to a radially outer side relative to the outer peripheral edge of the float bearing. In other words, a decrease in the amount of oil that is supplied to the tapered surface via the groove is suppressed. Therefore, oil lubrication between the end surface of the float bearing and the restricting portion of the coupling shaft is improved.

In the above configuration, the groove is located at an end portion of the tapered surface, opposite from a preceding side in a rotation direction of the coupling shaft when the turbocharger is being driven. With this configuration, the groove is located at a portion at which the clearance between the tapered surface and the restricting portion is largest in the rotation axis direction of the coupling shaft. In other words, the groove is located at a portion where the pressure of oil between the tapered surface and the restricting portion is relatively low. Therefore, oil flowing into the groove is easily supplied to the gap between the tapered surface of the float bearing and the restricting portion of the coupling shaft.

In the above configuration, an oil drain space is defined in the bearing housing, and an oil drain port is defined in the bearing housing. The oil drain space is used to drain oil, which is supplied to between the float bearing and the coupling shaft, to an outside. The oil drain port communicates the oil drain space with an outside of the bearing housing. At least part of the oil drain space is defined so as to surround an end portion of the float bearing, closer to the restricting portion, from a radially outer side, and is connected to a space between the end surface of the float bearing and the restricting portion.

With this configuration, oil supplied to between the end surface of the float bearing and the restricting portion of the coupling shaft flows outward in the radial direction of the coupling shaft and reaches the oil drain space. Then, the oil is drained to the outside of the bearing housing via the oil drain port. Thus, stagnation of oil between the end surface of the float bearing and the restricting portion of the coupling shaft is avoided. As a result, interference of flow of oil between the end surface of the float bearing and the restricting portion of the coupling shaft with stagnation of oil is reduced.

A manufacturing method for a turbocharger including a turbine wheel accommodated in a turbine housing, a compressor wheel accommodated in a compressor housing, and a coupling shaft that couples the turbine wheel and the compressor wheel includes welding an end portion of the turbine wheel to an end portion of the coupling shaft by rotating the turbine wheel and the coupling shaft 360 degrees around a rotation axis of the coupling shaft relative to an electron gun once in a state where electron beam caused by the electron gun is irradiated from an outer side in a radial direction of the coupling shaft to a contact portion between the end portion of the turbine wheel and the end portion of the coupling shaft.

With this configuration, since welding is performed by rotating the turbine wheel and the coupling shaft 360 degrees around the rotation axis of the coupling shaft relative to the electron gun once, a welding time can be reduced as compared to a manufacturing method for welding by rotating the turbine wheel and the coupling shaft 360 degrees around the rotation axis of the coupling shaft multiple times.

A turbocharger includes a turbine housing, a compressor housing, a bearing housing, and a coupling shaft. The turbine housing accommodates a turbine wheel. The compressor housing accommodates a compressor wheel. The bearing housing connects the turbine housing and the compressor housing. The coupling shaft couples the turbine wheel to the compressor wheel, and is accommodated in the bearing housing. A support hole in which the coupling shaft is accommodated extends through the bearing housing from the turbine housing side to the compressor housing side. A first seal member extending in a circumferential direction of the coupling shaft is interposed between an outer periphery of the turbine wheel-side end portion of the coupling shaft and an inner periphery of the support hole. A second seal member extending in the circumferential direction of the coupling shaft is interposed between the outer periphery of the turbine wheel-side end portion of the coupling shaft and the inner periphery of the support hole and on the compressor wheel side relative to the first seal member.

In the above configuration, as the pressure of exhaust gas flowing through the turbine housing increases, exhaust gas can flow into the compressor wheel side relative to the first seal member between the outer periphery of the coupling shaft and the inner periphery of the support hole. With this configuration, even when exhaust gas flows into the compressor wheel side relative to the first seal member in this way, flow of exhaust gas into the compressor wheel side relative to the second seal member is suppressed by the second seal member interposed between the outer periphery of the coupling shaft and the inner periphery of the support hole.

In the above configuration, the first seal member has an extended range of 180 degrees or greater and less than 360 degrees in the circumferential direction of the coupling shaft, the second seal member has an extended range of 180 degrees or greater and less than 360 degrees in the circumferential direction of the coupling shaft, and, when viewed in a rotation axis direction of the coupling shaft, at least one of the first seal member and the second seal member is interposed all around in the circumferential direction of the coupling shaft.

With the above configuration, exhaust gas can flow into the compressor wheel side relative to the first seal member via a gap where no first seal member is interposed between the outer periphery of the coupling shaft and the inner periphery of the support hole. With this configuration, since the first seal member and the second seal member are located on opposite sides of the coupling shaft, even when exhaust gas flows through the gap in the first seal member, flow of exhaust gas can be reduced by the second seal member.

In the above configuration, a coolant passage through which coolant flows is defined in the bearing housing, and part of the coolant passage extends to the turbine wheel side beyond the second seal member in the rotation axis direction of the coupling shaft.

With this configuration, in the rotation axis direction of the coupling shaft, part of the coolant passage extends to near the first seal member beyond the second seal member. Therefore, by heat exchange with coolant flowing through the coolant passage, not only the second seal member but also the first seal member is cooled. Thus, an excessively high temperature of the first seal member or the second seal member due to the heat of exhaust gas flowing through the turbine housing is avoided. As a result, deterioration of the first seal member or the second seal member due to an excessively high temperature is reduced.

An exhaust gas structure for an internal combustion engine including an exhaust pipe, a turbine housing of a turbocharger, and a catalyst. Exhaust gas flows through the exhaust pipe. The turbocharger is connected to the exhaust pipe. The catalyst is installed at a portion downstream of the turbine housing in the exhaust pipe and controls exhaust gas. The catalyst includes a cylindrical portion having a cylindrical shape and a plurality of partition walls extending in a direction of a central axis of the cylindrical portion. An accommodation space, a scroll passage, a discharge passage, and a bypass passage are defined in the turbine housing. A turbine wheel is accommodated in the accommodation space. The scroll passage is connected to the accommodation space, and introduces exhaust gas from an outside of the turbine housing to the accommodation space. The discharge passage is connected to the accommodation space, and discharges exhaust gas from the accommodation space to an outside of the turbine housing. The bypass passage is connected to the scroll passage and the discharge passage, and bypasses the turbine wheel. An upstream end surface of the catalyst is located in a central axis of an outlet portion of the bypass passage, from which exhaust gas is discharged. The central axis of the outlet portion intersects with the partition walls. When viewed in a direction perpendicular to the central axis of the outlet portion and the central axis of the cylindrical portion, an angle of acute angle that the central axis of the outlet portion makes with the central axis of the cylindrical portion falls within a range of 25 degrees to 35 degrees.

If the central axis of the outlet portion of the bypass passage is parallel to the central axis of the cylindrical portion of the catalyst, exhaust gas flowing through the bypass passage may flow to a downstream side without colliding with wall surfaces of the partition walls of the catalyst. In addition, if the angle that the central axis of the outlet portion of the bypass passage makes with the central axis of the cylindrical portion of the catalyst approaches 90 degrees, exhaust gas flowing through the bypass passage may collide with the upstream end surface of the catalyst and stagnate at a portion upstream of the catalyst.

With the above configuration, when exhaust gas flowing through the bypass passage reaches the catalyst, exhaust gas collides with the wall surfaces of the partition walls of the catalyst. Exhaust gas having collided with the wall surfaces of the partition walls of the catalyst flows to the downstream side along the wall surfaces of the partition walls. Therefore, the heat of exhaust gas is transferred to the partition walls of the catalyst, and the temperature of the catalyst can be quickly increased. In addition, with the above configuration, stagnation of exhaust gas flowing through the bypass passage at a portion upstream of the catalyst in the exhaust pipe due to collision of exhaust gas with the upstream end of the catalyst is reduced.

What is claimed is:

1. A turbocharger comprising:
a turbine housing accommodating a turbine wheel, the turbine housing defining a bypass passage, the bypass passage bypassing the turbine wheel and connecting a portion upstream of the turbine wheel in a direction of flow of exhaust gas and a portion downstream of the turbine wheel in the direction of flow of the exhaust gas; and
a waste gate valve connected to the turbine housing, the waste gate valve being configured to open the bypass passage and to close the bypass passage, wherein
a valve seat for the waste gate valve being provided at an opening edge of the bypass passage on an inner wall surface of the turbine housing,
the waste gate valve including a shaft and a valve element, the shaft extends through a wall of the turbine housing, the shaft is rotatably supported by the wall, the valve element extends in a radial direction of the shaft from an end portion of the shaft on an inner side of the turbine housing, a contact surface of the valve seat and a contact surface of the valve element being a flat surface, the contact surface of the valve seat being brought into contact with the valve element and the contact surface of the valve element being brought into contact with the valve seat, the waste gate valve being a one-piece molding including the shaft and the valve element, a rotation axis of the shaft being located away from the valve seat toward a portion downstream of the bypass passage in the direction of flow of exhaust gas in a direction perpendicular to the contact surface of the valve seat, in a cross section perpendicular to the rotation axis of the shaft and intersecting with the contact surface of the valve seat, a first distance being shorter than a second distance, the first distance is a distance from the contact surface of the valve element to the rotation axis of the shaft in a direction perpendicular to the contact surface of the valve element, and the second distance is a distance from the contact surface of the valve seat to the rotation axis of the shaft in a direction perpendicular to the contact surface of the valve seat, and a portion of the valve element distal to the shaft contacts the contact surface of the valve seat first when the bypass passage is set to the fully closed state.

2. The turbocharger according to claim 1, further comprising:

a link mechanism coupled to an end portion of the shaft on an outer side of the turbine housing and configured to transmit driving force from an actuator to the shaft, wherein:

the link mechanism includes a link arm coupled to the end portion of the shaft on the outer side of the turbine housing, and a link rod coupled to a portion of the link arm, spaced apart from a center of coupling between the link arm and the shaft in the radial direction of the shaft;

the link rod is configured to move from one side toward the other side in a longitudinal direction of the link rod when the bypass passage is set from an open state to a fully closed state;

in the fully closed state of the bypass passage, an imaginary straight line along the longitudinal direction of the link rod intersects with an imaginary plane parallel to the contact surface of the valve seat; and in the fully closed state of the bypass passage, the contact surface of the valve element is inclined such that a portion of the contact surface shifts toward the other side in the longitudinal direction of the link rod relative to the rotation axis of the shaft as the portion of the contact surface comes away from the link arm in a direction of the rotation axis of the shaft.

3. The turbocharger according to claim 1, wherein:

the valve element includes a valve main body having the contact surface of the valve element and a connecting portion connecting the valve main body and the shaft; and a size of the connecting portion in a direction perpendicular to the contact surface of the valve element increases toward the shaft.

* * * * *